US012255308B2

(12) United States Patent
Salvatierra et al.

(10) Patent No.: US 12,255,308 B2
(45) Date of Patent: Mar. 18, 2025

(54) SULFURIZED-CARBON CATHODE WITH CONDUCTIVE CARBON FRAMEWORK

(71) Applicant: Zeta Energy Corp., Houston, TX (US)

(72) Inventors: Rodrigo Villegas Salvatierra, Houston, TX (US); Tuo Wang, Houston, TX (US); Abdul-Rahman Olabode Raji, Houston, TX (US)

(73) Assignee: Zeta Energy LLC, Houston, TX (US)

( * ) Notice: Subject to any disclaimer, the term of this patent is extended or adjusted under 35 U.S.C. 154(b) by 845 days.

(21) Appl. No.: 17/430,594

(22) PCT Filed: Mar. 25, 2021

(86) PCT No.: PCT/US2021/024259
§ 371 (c)(1),
(2) Date: Aug. 12, 2021

(87) PCT Pub. No.: WO2021/195450
PCT Pub. Date: Sep. 30, 2021

(65) Prior Publication Data
US 2022/0209216 A1 Jun. 30, 2022

Related U.S. Application Data

(60) Provisional application No. 63/000,423, filed on Mar. 26, 2020, provisional application No. 63/133,745, (Continued)

(51) Int. Cl.
H01M 4/04 (2006.01)
H01M 4/02 (2006.01)
(Continued)

(52) U.S. Cl.
CPC ......... *H01M 4/0471* (2013.01); *H01M 4/139* (2013.01); *H01M 4/362* (2013.01); (Continued)

(58) Field of Classification Search
None
See application file for complete search history.

(56) References Cited

U.S. PATENT DOCUMENTS 4,416,960 A 11/1983 Eustace et al.
5,162,175 A 11/1992 Visco et al.
(Continued)

FOREIGN PATENT DOCUMENTS

CN 10436239 A 2/2015
CN 107437632 12/2017
(Continued)

OTHER PUBLICATIONS

"The thermal degradation of polyacrylonitrile" by Xue et al. published in Polymer Degradation and Stability 58 (1997) 193-202.*
(Continued)

*Primary Examiner* — Basia A Ridley
*Assistant Examiner* — Heng M. Chan
(74) *Attorney, Agent, or Firm* — Silicon Edge Law Group LLP; Arthur J. Behiel

(57) ABSTRACT

A cathode active surface includes a conductive framework of tangled nanofibers with lumps of amorphous carbon-sulfur distributed within them. The amorphous carbon-sulfur lumps are of carbon bonded to sulfur via carbon-sulfur chemical bonds and to the nanofibers via chemical bonds. The strength of the chemical bonds secures sulfur atoms within electrode to suppress the formation of undesirable polysulfides when in contact with an electrolyte. The tangled nanofibers bind the amorphous carbon-sulfur lumps and enhance thermal and electrical conductivities.

20 Claims, 23 Drawing Sheets

Related U.S. Application Data filed on Jan. 4, 2021, provisional application No. 63/133,752, filed on Jan. 4, 2021.

(51) Int. Cl.
*H01M 4/139* (2010.01)
*H01M 4/36* (2006.01)
*H01M 4/38* (2006.01)
*H01M 4/583* (2010.01)
*H01M 10/0525* (2010.01)

(52) U.S. Cl.
CPC ............ *H01M 4/38* (2013.01); *H01M 4/583* (2013.01); *H01M 10/0525* (2013.01); *H01M 2004/021* (2013.01)

(56) References Cited

U.S. PATENT DOCUMENTS

| | | | |
|---|---|---|---|
| 5,426,006 | A | 6/1995 | Delnick et al. |
| 6,326,104 | B1 | 12/2001 | Caja et al. |
| 6,576,370 | B1 | 6/2003 | Nakagiri et al. |
| 6,908,706 | B2 | 6/2005 | Choi et al. |
| 7,250,233 | B2 | 7/2007 | Choi et al. |
| 7,291,424 | B2 | 11/2007 | Kim et al. |
| 8,665,581 | B2 | 3/2014 | Fleischer et al. |
| 8,709,373 | B2 | 4/2014 | Hauge et al. |
| 8,940,436 | B2 | 1/2015 | Miyuki et al. |
| 9,096,437 | B2 | 8/2015 | Tour et al. |
| 9,455,094 | B2 | 9/2016 | Tour et al. |
| 9,673,452 | B2 | 6/2017 | Zhang et al. |
| 9,774,204 | B2 | 9/2017 | Karim et al. |
| 9,853,284 | B2 | 12/2017 | Zhang et al. |
| 9,882,241 | B2 | 1/2018 | Singh et al. |
| 9,923,234 | B2 | 3/2018 | Eitouni et al. |
| 10,044,031 | B2 | 8/2018 | Zhang et al. |
| 10,044,064 | B2 | 8/2018 | Eitouni et al. |
| 10,056,618 | B2 | 8/2018 | Li et al. |
| 10,153,514 | B2 | 12/2018 | Pratt et al. |
| 10,170,251 | B2 | 1/2019 | Mitlin et al. |
| 10,505,180 | B2 | 12/2019 | Cairns |
| 10,629,894 | B2 | 4/2020 | Fanous et al. |
| 10,683,419 | B2 | 6/2020 | Helms et al. |
| 11,600,876 | B2 | 3/2023 | Gazda |
| 2003/0113624 | A1 | 6/2003 | Kim et al. |
| 2003/0118908 | A1 | 6/2003 | Ishikawa et al. |
| 2009/0053594 | A1 | 2/2009 | Johnson et al. |
| 2009/0286163 | A1 | 11/2009 | Shin et al. |
| 2010/0159366 | A1 | 6/2010 | Shao-Horn et al. |
| 2011/0183206 | A1 | 7/2011 | Davis et al. |
| 2011/0200875 | A1* | 8/2011 | Miyuki ............... C08F 8/34 429/213 |
| 2011/0262807 | A1 | 10/2011 | Boren et al. |
| 2011/0318654 | A1 | 12/2011 | Janssen |
| 2012/0077084 | A1 | 3/2012 | Christensen et al. |
| 2012/0171574 | A1 | 7/2012 | Zhamu et al. |
| 2012/0231326 | A1 | 9/2012 | Biswal et al. |
| 2013/0065050 | A1 | 3/2013 | Chen et al. |
| 2013/0065128 | A1 | 3/2013 | Li et al. |
| 2013/0141045 | A1 | 6/2013 | Karim et al. |
| 2013/0157128 | A1 | 6/2013 | Solan et al. |
| 2013/0164626 | A1 | 6/2013 | Manthiram et al. |
| 2013/0171502 | A1 | 7/2013 | Chen et al. |
| 2013/0183547 | A1 | 7/2013 | Kourtakis et al. |
| 2013/0196235 | A1 | 8/2013 | Prieto et al. |
| 2013/0202961 | A1 | 8/2013 | Hagen et al. |
| 2013/0220817 | A1 | 8/2013 | Walker et al. |
| 2013/0224594 | A1 | 8/2013 | Yushin et al. |
| 2013/0260246 | A1 | 10/2013 | Chen et al. |
| 2014/0014030 | A1 | 1/2014 | Tour et al. |
| 2014/0234702 | A1 | 5/2014 | Zhang et al. |
| 2014/0178688 | A1 | 6/2014 | Tour et al. |
| 2014/0313636 | A1 | 10/2014 | Tour |
| 2014/0332731 | A1 | 11/2014 | Ma et al. |
| 2015/0010788 | A1 | 1/2015 | Aria et al. |
| 2015/0155549 | A1 | 6/2015 | Moganty et al. |
| 2015/0236372 | A1 | 8/2015 | Yushin |
| 2015/0311508 | A1 | 10/2015 | Cairns et al. |
| 2016/0240840 | A1 | 8/2016 | He et al. |
| 2016/0248084 | A1 | 8/2016 | Cairns et al. |
| 2016/0159878 | A1 | 10/2016 | Fong et al. |
| 2016/0329559 | A1 | 11/2016 | Cairns et al. |
| 2016/0359161 | A1 | 12/2016 | Nozue et al. |
| 2017/0092932 | A1 | 3/2017 | Kim |
| 2017/0194636 | A1 | 7/2017 | Osada et al. |
| 2017/0233250 | A1 | 8/2017 | Cairns et al. |
| 2017/0279122 | A1 | 9/2017 | Helms et al. |
| 2017/0294646 | A1 | 10/2017 | Zhang et al. |
| 2017/0352909 | A1 | 10/2017 | Ainsworth |
| 2017/0346084 | A1 | 11/2017 | Sakshaug et al. |
| 2018/0138504 | A1 | 5/2018 | Zhang et al. |
| 2018/0151884 | A1 | 5/2018 | Yushin et al. |
| 2018/0175379 | A1 | 6/2018 | Tour et al. |
| 2018/0183041 | A1 | 6/2018 | Tour et al. |
| 2018/0233784 | A1 | 8/2018 | Zhamu et al. |
| 2018/0287121 | A1 | 10/2018 | Kim |
| 2018/0287162 | A1 | 10/2018 | Tour et al. |
| 2019/0177171 | A1 | 6/2019 | Troegel et al. |
| 2019/0181425 | A1 | 6/2019 | Tour et al. |
| 2019/0214685 | A1 | 7/2019 | Chang et al. |
| 2019/0229371 | A1 | 7/2019 | Song et al. |
| 2019/0386322 | A1 | 12/2019 | Zhamu et al. |
| 2019/0386332 | A1 | 12/2019 | Zhamu et al. |
| 2020/0052290 | A1 | 2/2020 | He et al. |
| 2020/0099049 | A1 | 3/2020 | Cairns |
| 2020/0099054 | A1 | 3/2020 | Liu et al. |
| 2021/0036331 | A1 | 2/2021 | Korzhenko et al. |

FOREIGN PATENT DOCUMENTS

| | | |
|---|---|---|
| JP | 2013229257 A | 11/2013 |
| WO | 2010/044437 A1 | 4/2010 |
| WO | WO-2013001693 A1 | 1/2013 |
| WO | 2015092857 | 6/2015 |
| WO | WO-2015084945 A1 | 6/2015 |
| WO | WO-2016159878 A1 | 6/2016 |
| WO | WO-2016201101 A1 | 12/2016 |
| WO | WO-2017011052 A2 | 1/2017 |
| WO | WO-2017034650 A2 | 3/2017 |
| WO | WO-2017062950 A1 | 4/2017 |
| WO | WO-2017120391 A1 | 7/2017 |
| WO | WO-2017164963 A9 | 9/2017 |
| WO | WO-2018140451 A1 | 2/2018 |
| WO | WO-2018045226 A1 | 3/2018 |

OTHER PUBLICATIONS

"Accelerating the stabilization of polyacrylonitrile fibers by UV irradiation" by Son et al. published in Journal of Industrial and Engineering Chemistry 73 (2019) 47-51.*

Japanese Patent Office "Notice of Reasons for Rejection" dated Oct. 23, 2023 in Japanese Patent application No. 2022-552655, original in Japanese and English machine translation (9 pages).

Notification of Transmittal of the International Search Report and the Written Opinion of the International Searching Authority, or the Declaration, with International Search Report and Written Opinion of the International Searching Authority, Mail Date Jun. 25, 2021, re: Int'l Appln. No. PCT/US2021/24259. 9 pages.

Kalybekkyzy et al., Electrospun 3D Structured Carbon Current Collector for Li/S Batteries, 2, 10 Nanomaterials, vol. 10, Apr. 14, 2020 [retrieved on Jul. 26, 2022]. Retrieved from the internet: <URL:https://www.ncbi.nlm.nih.gov/pmc/articles/PMC7221739/pdf/nanomaterials-10-00745. pdf>. 13 pages.

Chen et al., "Vertically Aligned Carbon Nanofibers on Cu Foil as a 3D Current Collector for Reversible Li Plating/Stripping toward High-Performance Li—S Batteries," Adv. Funct. Mater. 2020, Published Nov. 4, 2019 (12 pages).

Armand, M. et al. "Building Better Batteries", Nature 2008, 451 (7179), 652-657 ("Armand 2008"), 6 pages.

Aurbach, D. et al. "A Short Review of Failure Mechanisms of Lithium Metal and Lithiated Graphite Anodes in Liquid Electrolyte

(56) References Cited

OTHER PUBLICATIONS

Solutions" Solid State Ionics 2002, 148, 405-416 ("Aurbach 2002"), 12 pages.
Bai, P. et al. "Transition of Lithium Growth Mechanisms in Liquid Electrolytes" Energy Environ. Sci. 2016, 9, 3221-3229 ("Bai 2016"), 9 pages.
Basile, A. et al. "Stabilizing Lithium Metal Using Ionic Liquids for Long-Lived Batteries". Nature Comm. 2016, 7, 11794, 11 pages.
Bates, J. et al. "Fabrication and Characterization of Amorphous Lithium Electrolyte Thin Films and Rechargeable Thin-Film Batteries". J. Power Sources 1993, 43 (1-3), 103-110 ("Bates 1993"), 8 pages.
Bates, J. et al. "Thin-film Lithium and Lithium-Ion Batteries", Solid State Ionics 2000, 135, 33-45; 13 pages.
Besenhard, J. et al. "Inorganic Film-Forming Electrolyte Additives Improving the Cycling Behaviour of Metallic Lithium Electrodes and the Self-Discharge of Carbon-Lithium Electrodes". J. Power Sources 1993, 44 (1-3), 413-420 ("Besenhard 1993"), 8 pages.
Bouchet, R. "Batteries: A Stable Lithium Metal Interface". Nat. Nanotechnol. 2014, 9, 572-573 ("Bouchet 2014"), 2 pages.
Bouchet, R. et al. "Single-Ion BAB Triblock Copolymers as Highly Efficient Electrolytes for Lithium-Metal Batteries", Nature Mater. 2013, 12, 452; 6 pages.
Bruce, P. et al. "Li—O2 and Li—S Batteries with High Energy Storage", Nat. Mater. 2011, 11 (2), 172-172 ("Bruce 2011"). 12 pages.
Cavallo et al. "A free-standing reduced graphene oxide aerogel as supporting electrode in a fluorine-free Li2S8 catholyte Li—S battery," Journal of Power Sources, Feb. 5, 2019, 7 pages.
Chebiam et al. "Comparison of the chemical stability of the high energy density cathodes of lithium-ion batteries," Electrochemistry Communications 2001, 3 (11), 624-627. 4 pages.
Cheon et al. "Rechargeable Lithium Sulfur Battery: II. Rate Capability and Cycle Characteristics," Journal of The Electrochemical Society 2003, 150 (6), A800-A805. 6 pages.
Claye, A. et al. "Solid-State Electrochemistry of the Li Single Wall Carbon Nanotube System". J. Electrochem. Soc. 2000, 147, 2845-2852 ("Claye 2000"), 9 pages.
Cohen, Y. et al. "Micromorphological Studies of Lithium Electrodes in Alkyl Carbonate Solutions Using in Situ Atomic Force Microscopy". J. Phys. Chem. B 2000, 104 (51), 12282-12291 ("Cohen 2000"), 10 pages.
Crowther, O. et al. "Effect of Electrolyte Composition on Lithium Dendrite Growth", J. Electrochem. Soc. 2008, 155, A806-A811 ("Crowther 2008"), 7 pages.
Ding, F. et al. "Dendrite-Free Lithium Deposition via Self-Healing Electrostatic Shield Mechanism", J. Am. Chem. Soc. 2013, 135 (11), 4450-4456 ("Ding II 2013"), 7 pages.
Ding, F. et al. "Effects of Carbonate Solvents and Lithium Salts on Morphology and Coulombic Efficiency of Lithium Electrode". J. Electrochem. Soc. 2013, 160 (10), A1894-A1901 ("Ding I 2013"), 9 pages.
Dresselhaus, M. et al. "Raman Spectroscopy on Isolated Single Wall Carbon Nanotubes". Carbon 2002, 40, 2043-2061 ("Dresselhaus 2002"), 19 pages.
Dunn, B. et al. "Electrical Energy Storage for the Grid: A Battery of Choices". Science (80). 2011, 334 (6058), 928-935 ("Dunn 2011"), 9 pages.
Ebbesen, T. et al. "Electrical Conductivity of Individual Carbon Nanotubes". Nature 1996, 382, 54-56 ("Ebbesen 1996"), 3 pages.
Evarts, E. "Lithium Batteries: To the Limits of Lithium". Nature 2015, 526, S93-S95 ("Evarts 2015") 4 pages.
Girishkumar, G. et al. "Lithium-Air Battery: Promise and Challenges". J. Phys. Chem. Lett. 2010, 1 (14), 2193-2203 ("Girishkumar 2010"); 11 pages.
Goodenough, J. et al., "The Li-Ion Rechargeable Battery: A Perspective". J. Am. Chem. Soc. 2013, 135 (4), 1167-1176 ("Goodenough 2013") 10 pages.

Hao, X. et al., "Ultrastrong Polyoxyzole Nanofiber Membranes for Dendrite-Proof and Heat-Resistant Battery Separators". Nano Lett. 2016, 16, 2981-2987 ("Hao 2016"), 7 pages.
Hirai, T. et al. "Effect of Additives on Lithium Cycling Efficiency". J. Electrochem. Soc. 1994, 141, 2300-2305 ("Hirai 1994"), 7 pages.
Holstiege et al. "Pre-Lithiation Strategies for Rechargeable Energy Storage Technologies: Concepts, Promises and Challenges," Batteries, Jan. 23, 2018, 39 pages.
Hou, J. et al "Graphene-based electrochemical energy conversion and storage: fuel cells, supercapacitors and lithium ion batteries", Physical Chemistry Chemical Physics, vol. 13, No. 34, Jan. 1, 2011, pp. 15384-15402.; 19 pages.
Hutchins, Mark "New chemistry promises better lithium sulfur batteries," PV Magazine, Jun. 22, 2020, 5 pages.
Ji et al. "Advances in Li—S batteries," Journal of Materials Chemistry 2010, 20 (44), 9821-26, 6 pages.
Jin et al., "Covalently Connected Carbon Nanostructures for Current Collectors in Both the Cathode and Anode of Li—S Batteries," Advanced Materials, 2016, (9094-102), 9 pages.
Jin, S. et al. "Efficient Activation of High-Loading Sulfur by Small CNTs Confined Inside a Large CNT for High-Capacity and High-Rate Lithium-Sulfur Batteries". Nano Lett. 2015, acs.nanolett. 5b04105 ("Jin 2015"), 8 pages.
Kamaya, N. et al. "A Lithium Superionic Conductor," Nature Mater. 2011, 10, 682; 5 pages.
Kang et al. "Cathode porosity is a missing key parameter to optimize lithium-sulfur battery energy density," Nature Communications, Oct. 10, 2019, 10 pages.
Kanno, R. et al. "Lithium Ionic Conductor Thio-LISICON: the Li2SGeS2P2S5 System", J. Electrochem. Soc. 2001, 148, A742. 6 pages.
Kim et al. "A fast and efficient pre-doping approach to high energy density lithium-ion hybrid capacitors," Journal of Materials Chemistry A of The Royal Society of Chemistry, Mar. 2014, 10029-33, 6 pages.
Kim, J. et al. "Controlled Lithium Dendrite Growth by a Synergistic Effect of Multilayered Graphene Coating and an Electrolyte Additive", Chem. Mater. 2015, 27 (8), 2780-2787 ("Kim 2015"), 8 pages.
Kozen, A. et al. "Next-Generation Lithium Metal Anode Engineering via Atomic Layer Deposition", ACS Nano 2015, 9(6), 5884-5892 ("Kozen 2015"), 9 pages.
Kumari et al. "Structural and electrical properties of amorphous carbon-sulfur composite films," Bull. Mater. Sci., vol. 27, No. 3, Jun. 2004, pp. 289-294. 6 pages.
Landi, B. et al. "Carbon Nanotubes for Lithium Ion Batteries". Energy Environ. Sci. 2009, 2, 638-654 ("Landi 2009"), 18 pages.
Landi, B. et al. "Lithium Ion Capacity of Single Wall Carbon Nanotube Paper Electrodes", J. Phys. Chem. C 2008, 112, 7509-7515 ("Landi 2008"); 7 pages.
Lee, H. et al. "A Simple Composite Protective Layer Coating that Enhances the Cycling Stability of Lithium Metal Batteries", J. Power Sources 2015, 284, 103-108 ("Lee 2015"); 6 pages.
Li, F. et al. "Identification of the Constituents of Double-Walled Carbon Nanotubes Using Raman Spectra Taken with [81 Different Laser-Excitation Energies". J. Mater. Res. 2003, 18, 1251-1258 ("Li 2003"), 9 pages.
Li, N. et al. "An Artificial Solid Electrolyte Interphase Layer for Stable Lithium Metal Anodes". Adv. Mater. 2016, 28 (9), 1853-1858 ("Li 2016"), 7 pages.
Li, W. et al. "The Synergetic Effect of Lithium Polysulfide and Lithium Nitrate to Prevent Lithium Dendrite Growth". Nat. Commun. May 6, 2015, 7436 ("Li 2015"), 8 pages.
Liang, Z. et al. "Composite Lithium Metal Anode by Melt Infusion of Lithium into a 3D Conducting Scaffold with Lithiophilic Coating". Proc. Natl. Acad. Sci. U. S. A. 2016, 113, 2862-2867 ("Liang 2016"), 6 pages.
Lin, D. et al. "Layered Reduced Graphene Oxide with Nanoscale Interlayer Gaps as a Stable Host for Lithium Metal Anodes", Nat. Nanotechnol. 2016, 11, 626-632 ("Lin 2016"); 8 pages.
Lin, D. et al. "Reviving the Lithium Metal Anode for High-Energy Batteries", Nat. Publ. Gr. 2017, 12 (3), 194-206 ("Lin I 2017"); 13 pages.

(56) References Cited

OTHER PUBLICATIONS

Lin, D. et al. "Three-Dimensional Stable Lithium Metal Anode with Nanoscale Lithium Islands Embedded in Ionically Conductive Solid Matrix". Proc. Natl. Acad. Sci. U. S. A. 2017, 114, 4613-4618 ("Lin II 2017"), 6 pages.
Lin, J. et al. "3-Dimensional Graphene Carbon Nanotube Carpet-Based Microsupercapacitors with High Electrochemical Performance", Nano Lett. 2013, 13, 72-78 ("Lin 2015"); 7 pages.
Liu, Y. et al. "An Artificial Solid Electrolyte Interphase with High Li-Ion Conductivity, Mechanical Strength, and Flexibility for Stable Lithium Metal Anodes". Adv. Mater. 2017, 29, 1605531 ("Liu 2017"), 8 pages.
Liu, Y. et al. "Lithium-Coated Polymeric Matrix as a Minimum Volume-Change and Dendrite-Free Lithium Metal Anode", Nat. Commun. 2016, 7, 10992 ("Liu 2016"), 9 pages.
Lu, L. et al. "Free-Standing Copper Nanowire Network Current Collector for Improving Lithium Anode Performance", Nano Lett. 2016, 16, 4431; 7 pages.
Lu, Y. et al. "Stable Lithium Electrodeposition in Liquid and Nanoporous Solid Electrolytes". Nat. Mater. 2014, 13, 961-969 ("Lu 2014"); 9 pages.
Luo et al., "A chemically stabilized sulfur cathode for lean electrolyte lithium sulfur batteries," Proceedings of the National Academy of Sciences (PNAS.org), May 15, 2020, 9 pages.
Mahmood, N. et al. "Nanostructured Anode Materials for Lithium Ion Batteries: Progress, Challenge and Perspective". Adv. Energy Mater. 2016, 6, 1600374 ("Mahmood 2016"), 22 pages.
Manthiram, A. et al. "Lithium-Sulfur Batteries: Progress and Prospects". Adv. Mater. 2015, 27 (12), 1980-2006 ("Manthiram 2015"), 27 pages.
Mikhaylik et al. "Polysulfide Shuttle Study in the Li/S Battery System," Journal of The Electrochemical Society 2004, 151 (11), A1969-A1976, 9 pages.
Murugan, R. et al. "Fast Lithium Ion Conduction in Garnet-Type $Li_7La_3Zr_2O_{12}$". Angew. Chem. Int. Ed. 2007, 46, 7778, 4 pages.
Noorden, R. "The Rechargeable Revolution: A Better Battery". Nature 2014, 507, 26-28 ("Noorden 2014"), 3 pages.
Osaka, T. et al. "Surface Characterization of Electrodeposited Lithium Anode with Enhanced Cycleability Obtained by $CO_2$ Addition", J. Electrochem. Soc. 1997, 144 (5), 1709 ("Osaka 1997"), 6 pages.
Othman, Arwa "Preparation of Sulfurized Granular Activated Carbon from Beji Asphalt Using Concentrated $H_2so_4$," Tikrit Journal of Pure Science, vol. 13 No. (3), 2008, 7 pages.
Peigney, A. et al. "Specific Surface Area of Carbon Nanotubes and Bundles of Carbon Nanotubes". Carbon 2001, 39, 507-514 ("Peigney 2001"), 9 pages.
Qian, J. et al. "High Rate and Stable Cycling of Lithium Metal Anode". Nat. Commun. 2015, 6, 6362 ("Qian 2015"), 9 pages.
Ren, Z. et al. "Synthesis of Large Arrays of Well-Aligned Carbon Nanotubes on Glass". Science 1998, 282, 1105-1107 ("Ren 1998"), 4 pages.
Roy, P. et al. "Nanostructured Anode Materials for Lithium Ion Batteries". J. Mater. Chem. A 2015, 3, 2454-2484 ("Roy 2015"), 31 pages.
Salvatierra, R. et al. "Graphene Carbon Nanotube Carpets Grown Using Binary Catalysts for High-Performance Lithium-Ion Capacitors". ACS Nano 2017, 11, 2724-2733 ("Salvatierra 2017"), 10 pages.
Stone, G. et al. "Resolution of the Modulus Versus Adhesion Dilemma in Solid Polymer Electrolytes for Rechargeable Lithium Metal Batteries", J. Electrochem. Soc. 2012, 159, A222, 7 pages.
Su, Y. et al. "Lithium-sulfur batteries with a microporous carbon paper as a bifunctional interlayer," Nature Communications 2012, 3, 1166, 6 pages.
Sun, Z. et al. "Large-Area Bernal-Stacked Bi-, Tri-, and Tetralayer Graphene". ACS Nano 2012, 6, 9790-9796 ("Sun 2012"), 7 pages.
Thess, A. et al. "Crystalline Ropes of Metallic Carbon Nanotubes", Science 1996, 273, 483-487 ("Thess 1996"), 6 pages.

Tung, S. et al. "A Dendrite-Suppressing Composite Ion Conductor from Aramid Nanofibres". Nat. Commun. 2015, 6, 6152 ("Tung 2015"), 7 pages.
Wang, C. et al. "Suppression of Lithium-Dendrite Formation by Using LAGP-PEO (LiTFSI) Composite Solid Electrolyte and Lithium Metal Anode Modified by PEO (LiTFSI) in All-Solid-State Lithium Batteries", ACS Appl. Mater. Interfaces 2017, acsami.7b00336 ("Wang 2017"); 9 pages.
Wei, S. et al. "Metal-Sulfur Battery Cathodes Based on Pan-Sulfur Composites", J. Am. Chem. Soc. 2015, 137, 12143-12152 ("Wei 2015"); 10 pages.
Whittingham, M. "History, Evolution, and Future Status of Energy Storage". Proc. IEEE 2012, 100 (Special Centennial Issue), 1518-1534 ("Whittingham 2012"), 17 pages.
Wikipedia "Lithium-sulfur battery," Retrieved from https://en.wikipedia.org/w/index.php?title=Lithium-sulfur_battery&oldid=963354052, last edited on Jun. 19, 2020, at 10:29 (UTC), 9 pages.
Xu, W. et al. "Lithium Metal Anodes for Rechargeable Batteries", Energy Environ. Sci. 2014, 7 (2), 513-537 ("Xu 2014"); 25 pages.
Yan, K. et al. "Selective Deposition and Stable Encapsulation of Lithium through Heterogeneous Seeded Growth", Nat. Energy 2016, 1, 16010 ("Yan 2016"); 8 pages.
Yan, Z. et al. "Three-Dimensional Metal Graphene Nanotube Multifunctional Hybrid Materials," ACS Nano 2013, 7, 58-64. DOI: 10.1021/nn3015882; 7 pages.
Yang et al. "Nanostructured sulfur cathodes," Chem Soc Rev of The Royal Society of Chemistry, Jul. 2012, 3018-32, 15 pages.
Yang, C. et al. "Accommodating Lithium into 3D Current Collectors with a Submicron Skeleton Towards Long-Life Lithium Metal Anodes". Nat. Commun. 2015, 6, 8058 ("Yang 2015"), 9 pages.
Yazami, R. et al. "A Reversible Graphite-Lithium Negative Electrode for Electrochemical Generators", J. Power Sources 1983, 9, 365-371 ("Yazami 1983"); 7 pages.
Zhang et al. "A carbon nanofiber network for stable lithium metal anodes with high Coulombic efficiency and long cycle life," Tsinghua University Press Springer, Nano Research DOI 10.1007/s12274-016-1219-2, Jul. 17, 2016; 9 pages.
Zhang et al. "Enhancement of long stability of sulfur cathode by encapsulating sulfur into micropores of carbon spheres," Energy & Environmental Science, 2010, 3, 1531-37, 7 pages.
Zhang, H. et al. "Three-Dimensional Bicontinuous Ultrafast-Charge and -Discharge Bulk Battery Electrodes", Nat. Nanotechnol. 2011, 6, 277-281 ("Zhang 2011"); 5 pages.
Zhang, J. et al. "Lithium Metal Anodes and Rechargeable Lithium Metal Batteries", 1st ed.; Hull, R. et al., Eds.; Chapter 4, Springer International Publishing, 2017 ("J. Zhang 2017"); 26 pages.
Zhang, R. et al. "Conductive Nanostructured Scaffolds Render Low Local Current Density to Inhibit Lithium Dendrite Growth". Adv. Mater. 2016, 28, 2155-2162 ("Zhang 2016"), 8 pages.
Zhang, S. et al. "Charge and Discharge Characteristics of a Commercial $LiCoO_2$-Based 18650 Li-Ion Battery", J. Power Sources 2006, 160, 1403-1409 ("Zhang 2006"); 7 pages.
Zhang, S., "Sulfurized carbon: a class of cathode materials for high performance lithium/sulfur batteries," Frontiers in Energy Research, Dec. 2013, 10 pages.
Zhang, Y. et al. "A Carbon-Based 3D Current Collector with Surface Protection for Li Metal Anode", Nano Res. 2017, 10, 1356-1365 ("Y. Zhang II 2017"); 11 pages.
Zhang, Y. et al. "High-Capacity, Low-Tortuosity, and Channel-Guided Lithium Metal Anode". Proc. Natl. Acad. Sci. U.S.A. 2017, 114, 3584-3589 ("Y. Zhang I 2017"), 6 pages.
Zheng et al. "In Situ formed lithium sulfide/microporous carbon cathodes for lithium-ion batteries," ACS Nano, vol. 7, No. 12, 2013, pp. 10995-11003, 9 pages.
Zheng, G. et al. "Interconnected Hollow Carbon Nanospheres for Stable Lithium Metal Anodes", Nat. Nanotechnol. 2014, advance on (8), 618-623 ("Zheng 2014"); 6 pages.
Zhou, W. et al. "Plating a Dendrite-Free Lithium Anode with a Polymer/Ceramic/Polymer Sandwich Electrolyte", J. Am. Chem. Soc. 2016, 138 (30), 9385-9388 ("Zhou 2016"); 4 pages.
Zhu, Y. et al. "A seamless three-dimensional carbon nanotube graphene hybrid material," Nature Communications 2012, 3, 1225, 7 pages.

(56) References Cited

OTHER PUBLICATIONS

Evers and Nazar, "New Approaches for High Energy Density Lithium-Sulfur Battery Cathodes," vol. 46, No. 5, Oct. 10, 2012, pp. 1135-1143, Accounts of Chemical Research (9 pages).

Ji et al., "A highly ordered nanostructured carbon-sulphur cathode for lithium-sulphur batteries," Nature Materials, vol. 8, Jun. 2009, www.nature.com/naturematerials (7 pages).

Ji et al., "Stabilizing lithium-sulphur cathodes using polysulphide reservoirs," nature communications, DOI: 10.1038/ncomms1293, www.nature.com/naturecommunications, May 24, 2011 (7 pages).

Kaskel, "Lithium-Sulfur Batteries: Current Achievements and Further Development," Batteries & Supercaps 2022, 5, e202200467 (1 of 3), (3 pages).

Li et al., "A high-energy sulfur cathode in carbonate electrolyte by eliminating polysulfides via solid phase lithium-sulfur transformation," Nature Communications | (2018) 9:4509 | DOI: 10.1038/s41467-018-06877-9 | www.nature.com/naturecommunications (10 pages).

Liang et al., "A highly efficient polysulfide mediator for lithium-sulfur batteries," Nature Communications | 6:5682 | DOI: 10.1038/ncomms6682lwww.nature.com/naturecommunications, Jan. 6, 2015 (8 pages).

Markevich et al., "Review—On the Mechanism of Quasi-Solid-State Lithiation of Sulfur Encapsulated in Microporous Carbons: Is the Existence of Small Sulfur Molecules Necessary?", Journal of The Electrochemical Society, 164 (1) A6244-A6253, Dec. 13, 2016 (10 pages).

Pang et al., "Advances in lithium-sulfur batteries based on multi-functional cathodes and electrolytes," Nature Energy | vol. 1 | Sep. 2016 | www.nature.com/natureenergy (11 pages).

Pang et al., Surface-enhanced redox chemistry of polysulphides on a metallic and polar host for lithium-sulphur batteries, Nature Communications | 5:4759 | DOI: 10.1038/ncomms5759www.nature.com/naturecommunications, Aug. 16, 2014 (8 pages).

Schuster et al., "Spherical Ordered Mesoporous Carbon Nanoparticles with High Porosity for Lithium-Sulfur Batteries," Angew. Chem. Int. Ed. 2012, 51, 3591-3595 (5 pages).

Japanese Patent Office "Decision of Refusal" dated Jul. 25, 2024 in Japanese Patent application No. 2022-552655, original in Japanese and English machine translation (4 pages).

European Patent Office, "Extended European Search Report" dated Oct. 8, 2024 in application No. 21776509.8-1103/4128395 PCT/US2021024259 entitled "Sulfurized-Carbon Cathode With Conductive Carbon Framework" (9 pages).

Zhipeng Zeng and Xingbo Liu, "Sulfur Immobilization by "Chemical Anchor" to Suppress the Diffusion of Polysulfides in Lithium-Sulfur Batteries," Advanced Materials Interfaces 2018, 5, 1701274 (40 pages).

\* cited by examiner

1300

SULFURIZED-CARBON CATHODE WITH CONDUCTIVE CARBON FRAMEWORK

BACKGROUND

An electric battery includes one or more electric cells. Each cell includes a positive electrode (cathode) and a negative electrode (anode) physically separated by an ion conductor (electrolyte). When a cell is discharged to power an external circuit, the anode supplies negative charge carriers (electrons) to the cathode via the external circuit and positive charge carriers (cations) to the cathode via the internal electrolyte. During charging, an external power source drives electrons from the cathode to the anode and the resultant charge imbalance pulls cations from the cathode to the anode via the electrolyte.

Lithium-ion (Li-ion) batteries store charge in the anode as Li cations (aka Li ions). Li-ion batteries are rechargeable and ubiquitous in mobile communications devices and electric vehicles due to their high energy density, a lack of memory effect, and low self-discharge rate. Lithium-metal batteries store charge in the anode as lithium metal, which is superior to Li ions due to a higher theoretical specific capacity, lower electrochemical potential, and lower density. Unfortunately, rechargeable lithium-metal batteries have yet to be commercialized, mainly due to the growth of electrically conductive lithium dendrites that can extend from anode to cathode providing a destructive and potentially dangerous internal short. Also troubling, lithium metal produces side reactions with the electrolyte that consume both and increase cell impedance. Both dendrites and lithium side reactions reduce cell life below levels that are commercially viable for important markets.

Cathodes in most popular lithium-based batteries include cobalt, manganese, and nickel, all of which are mined at considerable financial and environmental cost. Also important, these materials are not distributed evenly across the globe, leading to fears of scarcity, supply disruptions, and concomitant political and economic instabilities. Cobalt is particularly troublesome because supply is located predominantly in the conflict-torn Democratic Republic of Congo and supply is dominated by a small number of companies. There is therefore a strong demand for battery components that reduce or eliminate the needs for cobalt and nickel.

BRIEF DESCRIPTION OF THE FIGURES

The present invention is illustrated by way of example, and not by way of limitation, in the figures of the accompanying drawings and in which like references refer to similar elements and in which:

FIG. 22 shows three cross sections of a cell 2200 like cell 2000 of FIG. 20 with like-identified elements being the same or similar.

FIG. 23 depicts a rechargeable energy storage cell 2300 that is similar to storage cell 2000 of FIG. 20 with like-identified elements being the same or similar.

DETAILED DESCRIPTION

Figure 1:
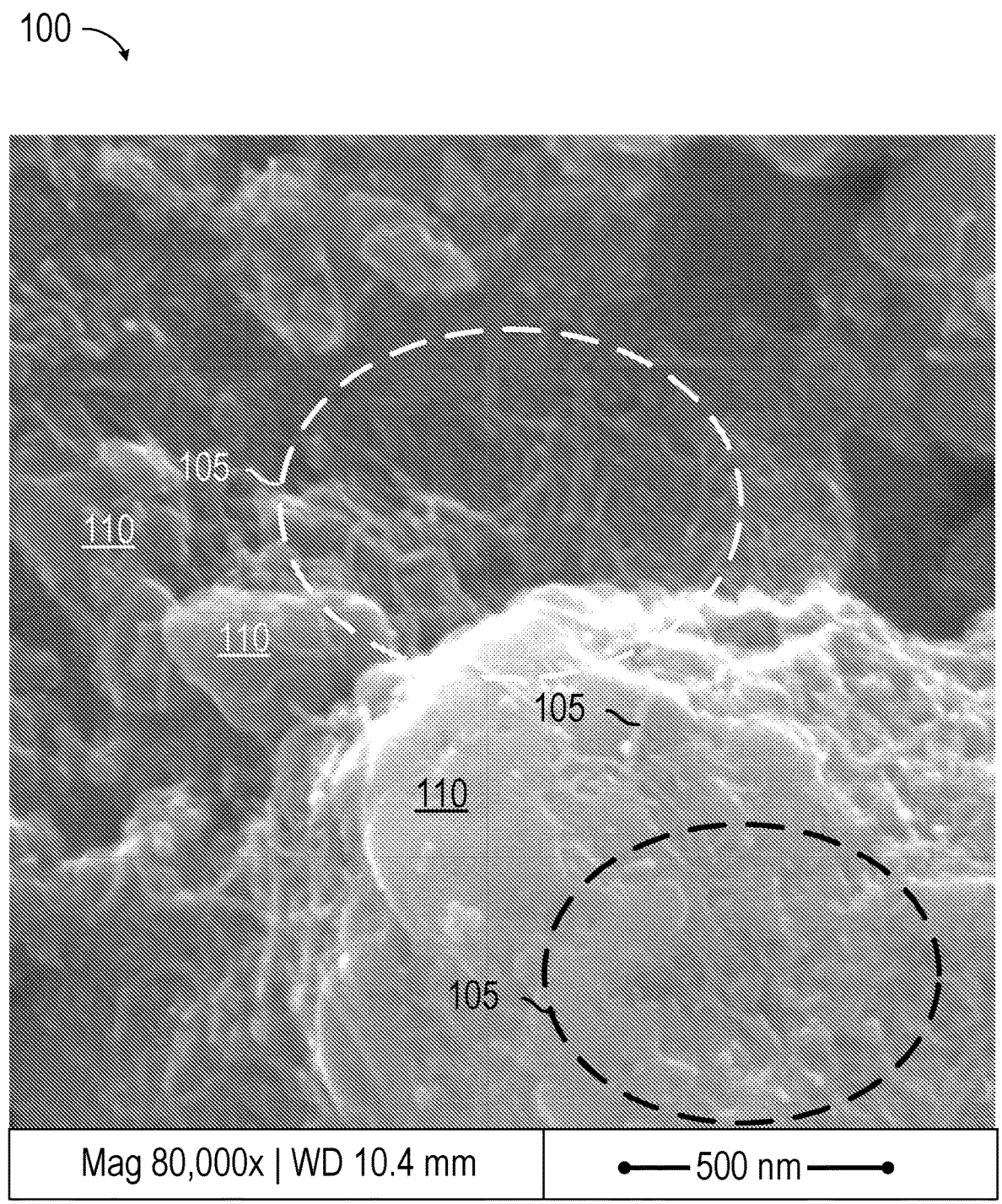
FIG. 1 is a SEM image at 80,000× magnification of an active surface of an electrode 100, a cathode for use in an energy-storage device.

FIG. 1 is a SEM image at 80,000× magnification of an active surface of an electrode 100, a cathode for use in an energy-storage device. The active surface of electrode 100 exchanges lithium ions with an electrolyte (not shown).

Electrode 100 includes a conductive framework of tangled nanofibers 105, carbon nanotubes in this example, with lumps 110 of amorphous carbon-sulfur distributed within the tangled nanofibers. The amorphous carbon-sulfur lumps 110 are of carbon bonded to sulfur via carbon-sulfur chemical bonds and to nanofibers 105 via chemical bonds. The strength of the chemical bonds secures sulfur atoms within electrode 100, and thus suppresses the formation of undesirable polysulfides that would otherwise reduce cell life. Tangled nanofibers 105 bind the active materials within electrode 100 while enhancing thermal and electrical conductivities of the active layer.

Figure 2:
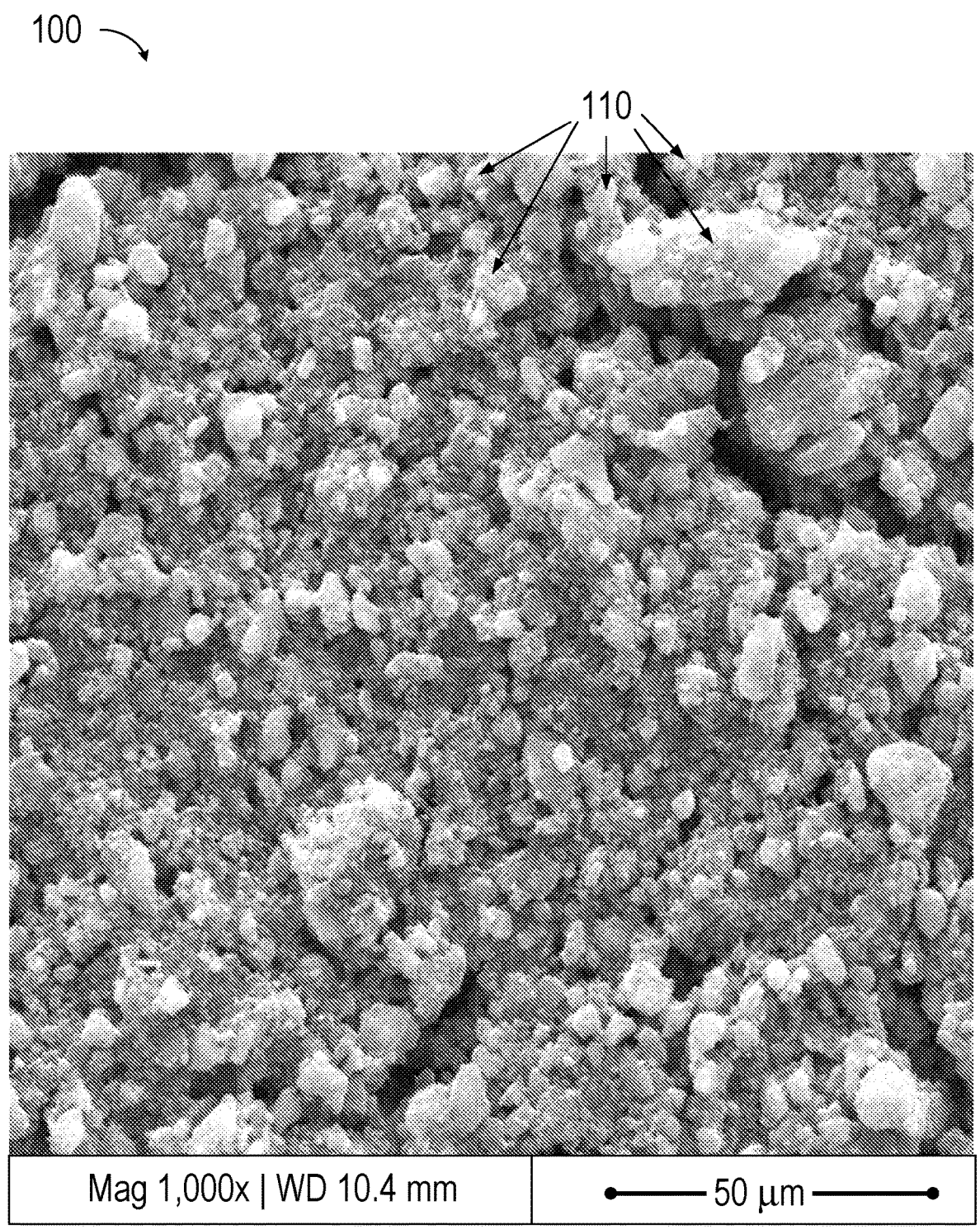
FIG. 2 is a SEM image of the active surface of electrode 100 at 1,000× magnification.

FIG. 2 is a SEM image of the active surface of electrode 100 at 1,000× magnification. Lumps 110 of various sizes are visible at this level of magnification, but the carbon nanotubes of the conductive network are too thin to resolve. Carbon nanotubes (tubes of carbon with diameters measured in nanometers) are of particularly high tensile strength and exhibit excellent thermal and electrical properties. Nanofibers of different sizes and types can be used in other embodiments. For example, the tangled nanofibers can include one or a combination of nanotubes, nanoribbons, graphene, carbon fibers, aluminum nanofibers, and nickel nanofibers.

Figure 3:
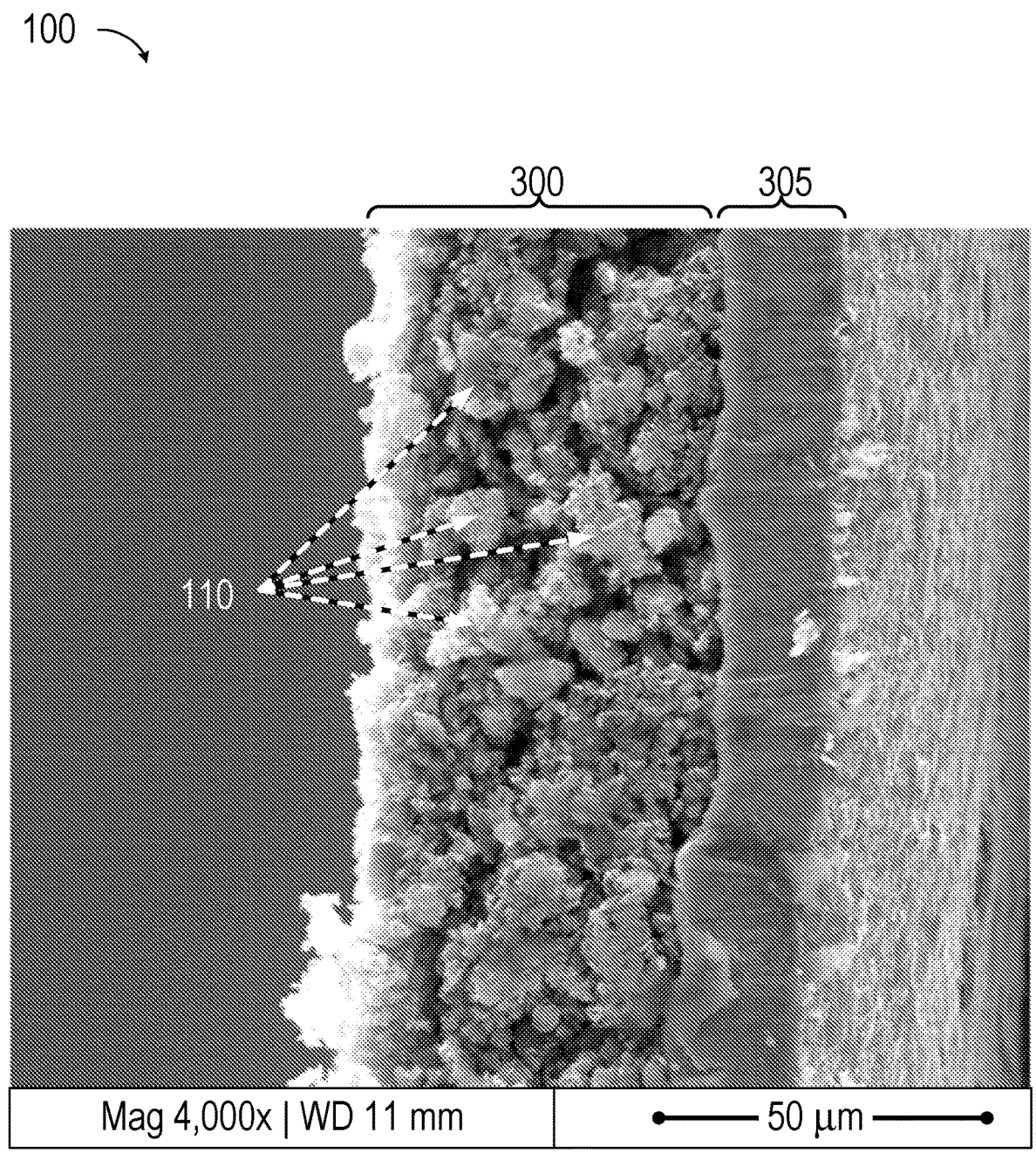
FIG. 3 is an SEM image of electrode 100 in cross section at 4,000× magnification.

FIG. 3 is an SEM image of electrode 100 in cross section at 4,000× magnification. An active layer 300 of lumps 110 distributed within a conductive network of nanofibers (FIG. 1) is physically and electrically connected to an aluminum substrate 305 that serves as a current collector when electrode 100 is incorporated into e.g. a capacitor or electrochemical cell. Active layer 300 is about 50 μm thick, and substrate 305 about 20 μm, though this example is not limiting. Active layer 300 can be relatively dense, advantageously reducing electrolyte volume and thus cell volume. Some embodiments have cell cathode active material with a density of 0.4-1.2 g/cm$^3$, a porosity of 20-70%, and a pore volume of 0.2-1.8 cm$^3$/g.

Lumps 110 include sulfur that is reacted with and chemically bonded to the conductive network of nanofibers. Lumps 110 also include amorphous carbon with both sp2 and sp3 hybridized carbon atoms and are, like the sulfur, chemically bonded to the conductive network of nanofibers. The ratio of sp2 carbon atoms to sp3 carbon atoms is 50-90 at. % to 50-10 at. %, the sp2 indicative of aromatic rings. The chemical bonds securing lumps 110 to nanofibers 105 are predominantly covalent bonds. The resultant material is largely a sulfurized amorphous carbon that is tightly bonded to the conductive framework of tangled nanofibers, though some embodiments include as much as 20 wt % free sulfur, which is to say sulfur that is not chemically bonded to carbon either directly or via an intermediate atom or atoms (e.g., via one or more sulfur atoms, at least one of which is bonded to carbon).

The chemical stability of the active layer 300 suppresses polysulfide formation and thus allows for relatively high sulfur levels and concomitant lithium storage. In some embodiments, for example, active layer 300 includes between 30 and 80 wt % sulfur. Active layer 300 can have low levels of oxygen, e.g. less than 10 wt %, which reduces the risks associated with thermal runaway. A polymer used in the formation of active layer 300 contributes hydrogen, in one example at a concentration of between five and twenty atomic percent of the active layer.

Lumps 110 are largely of amorphous carbon-sulfur with sp2 aromatic carbon clusters having an average maximum dimension of less than 20 nm dispersed within a matrix of sp3 carbon atoms. Dopants, like nitrogen and oxygen, can be added to improve conductivity and wettability for electrolyte or solvents. The amorphous carbon-sulfur can include one or a combination of monocyclic or heterocyclic aromatic rings, and the heterocyclic rings can include at least one of oxygen, nitrogen, and sulfur.

Figure 4:
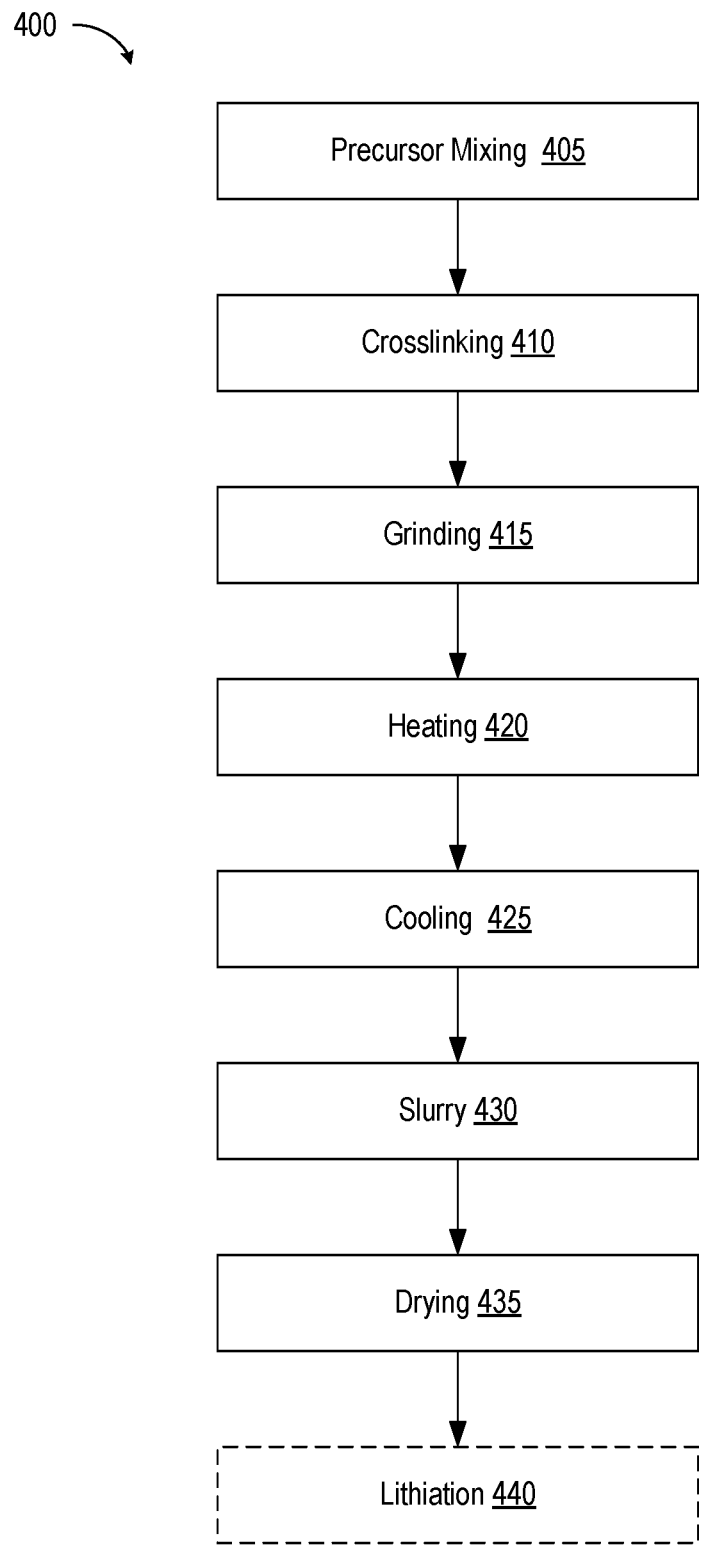
FIG. 4 is a flowchart depicting a method 400 of forming electrode 100 to make e.g. a cathode for an energy-storage device.
Figure 5:
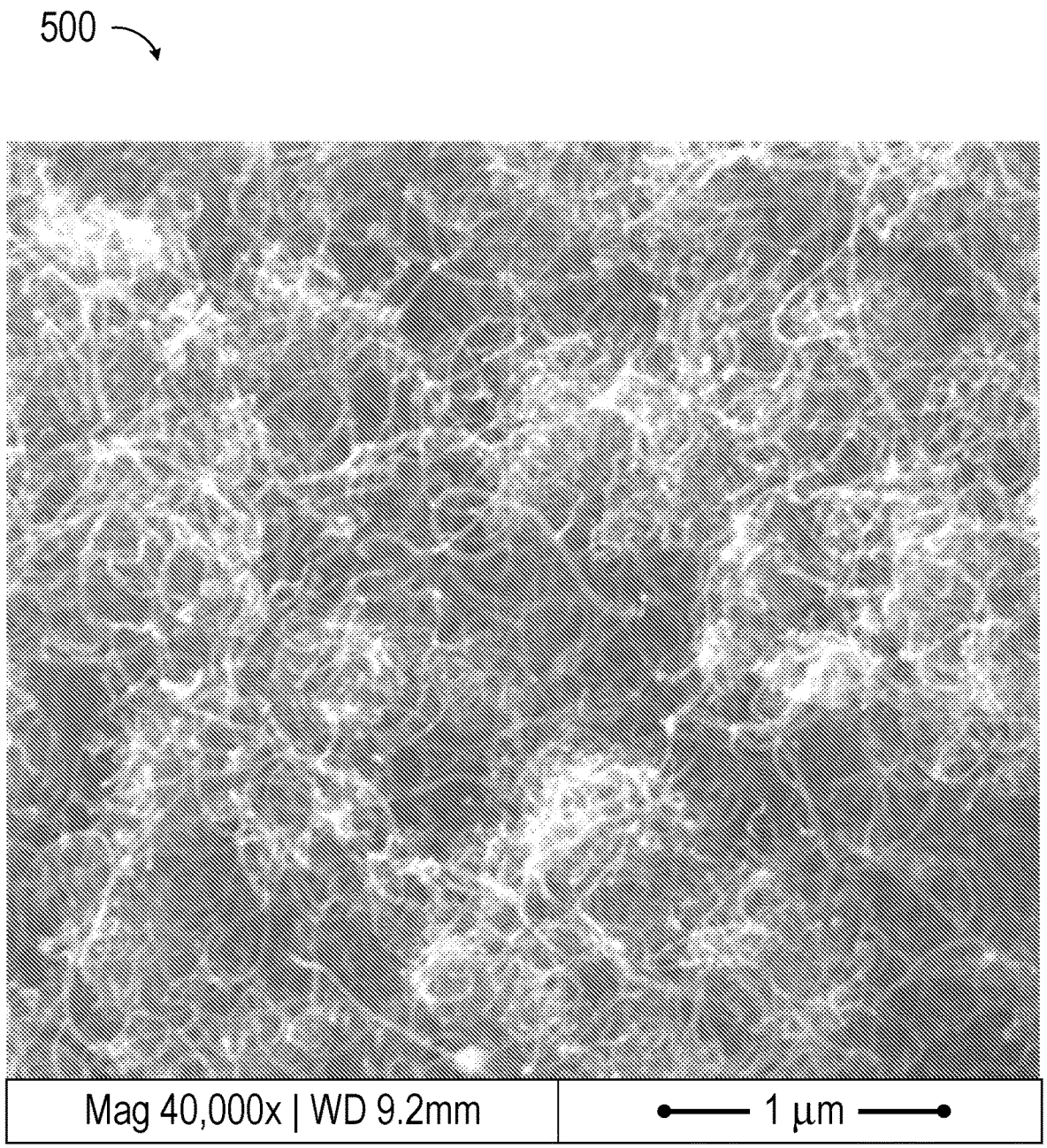
FIG. 5 depicts carbon nanotubes 500 at 40,000× magnification.

FIG. 4 is a flowchart depicting a method 400 of forming electrode 100 to make e.g. a cathode for an energy-storage device. First, at step 405, nanofibers are mixed with powders of sulfur and a polymer with a molecular weight of between 100,000 Dalton and 1,000,000 Dalton. In this example, carbon nanotubes 500 (FIG. 5) are mixed with a powder of poly(acrylonitrile-co-vinyl acid), or PAN, with an average molecular weight of 150,000 Dalton, and a powder of sulfur at a mass ratio of 1.5 wt %:16.4 wt %:82.1 wt %, respectively. This mixing can be done in a polyethylene container containing zirconia beads using a planetary mixer at 600 rpm for 10 min, then at 1,500 rpm for 10 min, yielding a fused/agglomerated powder. Carbon nanotubes 500 are e.g. 500 nm to 10 μm long and five to one-hundred nanometers in diameter. In some embodiments, the sulfur is admixed in vapor form rather than as a powder.

Next, in step 410, the agglomerated powder from step 405 is crosslinked and hardened, for example by further mixing at 1,500 rpm for at least ten additional minutes. Crosslinking refers to the formation of crosslinks, bonds that interlink polymer chains. Crosslinks can be covalent or ionic bonds. Step 410 heats the mixture to induce the crosslinking of the precursor, the heat reaching a temperature of between 40° C. and 90° C. The carbon nanotubes act as crosslinking, hardening agents. The crosslinked polymer chains and tangled nanofibers create a conductive carbon framework, or scaffold, that maintains the physical integrity of the crosslinked, hardened mixture during subsequent heating. The mixture from step 410 is removed and broken into chunks or pellets. The chunks or pellets from step 410 are ground using e.g. a mortar and pestle (step 415).

The precursor mix made with tangled carbon nanotubes was much harder and more abrasion resistant than one without the carbon nanotubes, which suggests that the carbon nanotubes play a role in producing hardened and rigid material by providing a rigid framework that supports lumps 110. The fused, hardened properties of the precursor mix from step 415 indicate that the transformation was not mere branching of the polymer chains but is also accompanied by crosslinking of the polymer chains aided by the sulfur and heat, thus restricting mobility of the chains during the subsequent high-temperature treatment.

Next, in step 420, the ground, agglomerated powder mixture is transferred to a furnace that is evacuated of air, filled with an inert gas (e.g. argon or nitrogen) and heated at a reaction temperature of 450° C. for 6 hours under the inert gas in a quartz tube using a split-tube furnace. This heat treatment, above the glass-transition temperature and below the decomposition temperature of the PAN polymer, pyrolyzes the PAN to chemically bond carbon from the PAN to the nanofibers and the sulfur, thus forming amorphous carbon-sulfur chemically bonded to the nanofibers. The heating additionally drives off constituent hydrogen and nitrogen, though some hydrogen and nitrogen can remain after the process. Steps 405 through 420 can be carried out absent some or all of the nanotubes to make sulfurized-carbon granules. Carbon nanomaterials or additional carbon nanomaterials of the same or a different type (e.g., ribbons versus tubes of the same or different lengths) can then be incorporated with the sulfurized-carbon granules via mixing and heating. The material is then cooled for e.g. 1 hours with the aid of a fan (step 425).

Cooled material from step 425 was characterized with thermogravimetric-mass spectroscopy (TG-MS) analysis and a significant mass loss of about 65 wt % was observed upon heating from room temperature to 1,000° C., the residual 35 wt % consisting primarily of carbon. The lost mass was primarily sulfur, and also included nitrogen, oxygen, and hydrogen that had been bonded to the conductive framework with sulfurized carbon. The sulfur content prior to heating was determined to be about 40 wt % of the cooled material from step 425.

The material from cooling step 425 is mixed with a powdered carbon (e.g. acetylene black), a binder, and an organic solvent or water to form a slurry (step 430). The sulfur in the material from step 425 is strongly bonded to carbon. The resultant chemical stability allows the material to be combined with inexpensive and environmentally friendly water without producing significant levels of poisonous, corrosive, and flammable hydrogen sulfide. For example, in one experiment using water to form a slurry, a detector with a detection limit of 0.4 ppm failed to detect hydrogen sulfide. The resistance to hydrogen-sulfide formation is due to the strong bonding between the sulfur and carbon.

The slurry can contain one or more water-soluble binders, e.g. polyacrylic acid, carboxymethylcellulose, or styrene butadiene rubber. The binder and carbon additive can compose from e.g. 2 to 30 wt % of the solid mass. The slurry is spread over a conductor (e.g. an aluminum foil) and dried (step 435) by e.g. freeze drying and/or heating in dry air. The dried cathode layer is compressed e.g. by passing the foil between rollers. In an embodiment in which the dried slurry and underlying foil are together about 100 microns, the compression reduces cathode-layer thickness to between 50 and 90 microns, depending on the mass loading, with little impact on the foil. Mass loading of sulfurized-carbon cathodes can be e.g. 2 to 10 mg/cm$^2$, with a final sulfur content of e.g. from 30 to 80 wt %.

"Dry-electrode" embodiments omit steps 430 and 435. Rather than adding a liquid to form a slurry, the material from step 425 can be compressed into a dry film over a current collector or can be compressed into a dry film before application to the current collector. The drying step can thus be omitted. The cathode with the dried, compressed layer from step 435 or a dry-electrode process can be incorporated into a lithium-metal cell. During discharge, lithium metal oxidized at the anode releases lithium ions through the electrolyte to the cathode. An optional lithiation process (step 440) may be used. Lithium ions sourced from, e.g., lithium foil can be electrochemically intercalated into or plated onto a carbon anode layer prior to cell assembly, for example. Other methods of lithiation are detailed below. Cathodes from method 400 are compatible with other types of anodes, including those that incorporate porous carbon and silicon to store active metals (e.g., Li, Mg, Al, Na, and K) and their ions.

Returning to FIG. 4, the sulfur content of active layer 300 was varied by tuning the reaction temperature of heating step 420 between 300° C. and 600° C. At temperatures lower than 450° C., the mass loss upon heating during TG-MS analysis was greater than about 65 wt %. At temperatures above 450° C., the mass loss upon heating during TG-MS analysis is lower than about 65 wt %. Below 300° C. and above 600° C., the lithium storage capacity of the electrode made from the material was lower than obtained from materials produced between 300° C. and 600° C.

The size of lumps 110 and the conductivity of active layer 300 can be varied. In a synthesis similar to the method of FIG. 4, the mixed precursor material was heated to between 100° C. and 250° C. to crosslink the precursor material. The crosslinked material was heated again, this time to between 300° C. and 500° C. to generate sulfurized carbon; and yet again to between 500° C. and 600° C. to promote further carbonization and/or graphitization, which increases the size of graphitic domains in the sulfurized carbon. Larger graphitic domains increase the ratio of sp2 to sp3 carbon, which increases the ratio of aromatic sp2 to sp3.

The material of step 420 includes graphitic domains or clustered aromatic carbon rings in the sulfurized carbon. The size of the domains or clusters can be increased for improved electrical conductivity. In one embodiment, for example, the domains or clusters were enlarged by subjecting the material to heat treatments up to a temperature of at least 600° C. for a period between one microsecond and one minute. The rapid heat treatment was induced by preheating the reactor to a temperature of at least 600° C. and moving the sulfurized carbon from a cold zone to the hot zone. These heat treatments also increase the ratio of sp2 to sp3 carbon and reduce hydrogen content. Heat treatment above 600° C. for more than an hour leads to a significant decrease in lithium storage capacity of the material.

The foregoing method of making an electrode is not limiting. Other discrete or continuous processes can also be used. In one embodiment, for example, the discrete process of FIG. 4 is adapted to a continuous roll-to-roll process in which the active material is formed on one or both sides of a roll of aluminum foil.

Figure 6A:
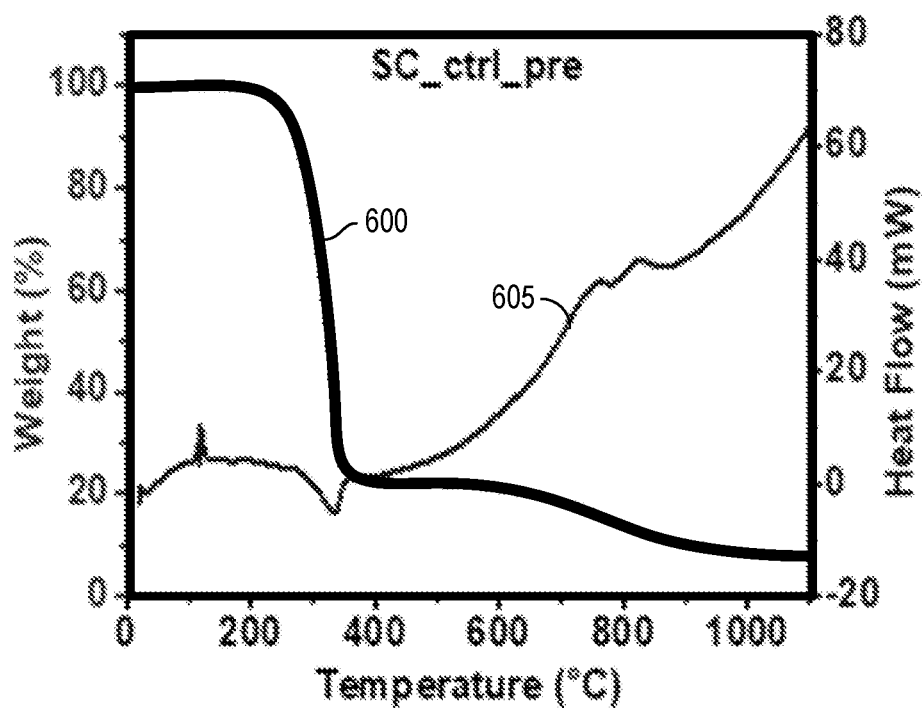
FIG. 6A depicts a thermogravimetric (TG) plot 600 and differential scanning calorimetric (DSC) plot 605 of the precursor mixture from step 405 of FIG. 4.

FIG. 6A depicts a thermogravimetric (TG) plot 600 and differential scanning calorimetric (DSC) plot 605 of the precursor mixture from step 405 of FIG. 4. Without crosslinking, the material rapidly loses sulfur above about 300° C.

Figure 6B:
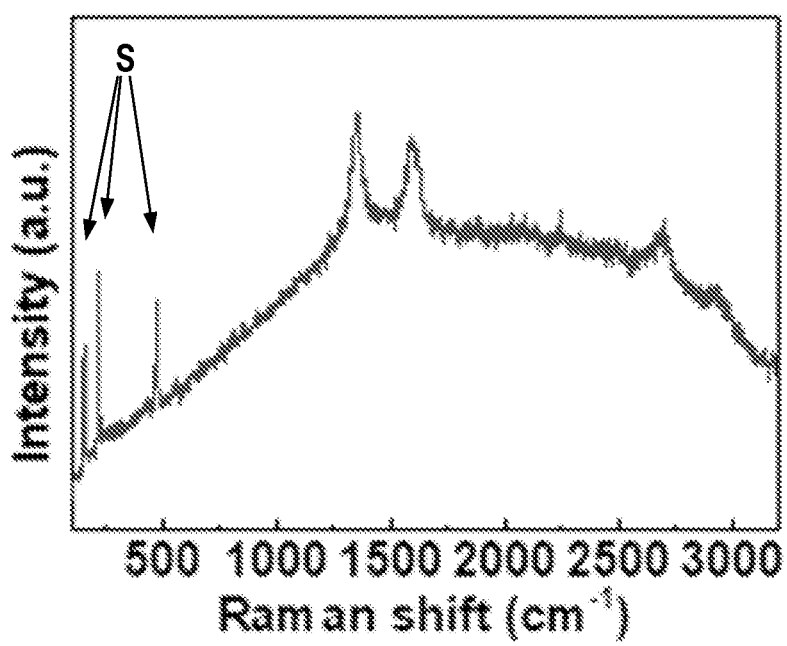
FIG. 6B depicts the Raman spectrum of the precursor mixture from step 405 of FIG. 4.

FIG. 6B depicts the Raman spectrum of the precursor mixture from step 405 of FIG. 4. Raman shifts below about 500 cm$^{-1}$ indicate the presence of elemental sulfur.

Figure 7A:
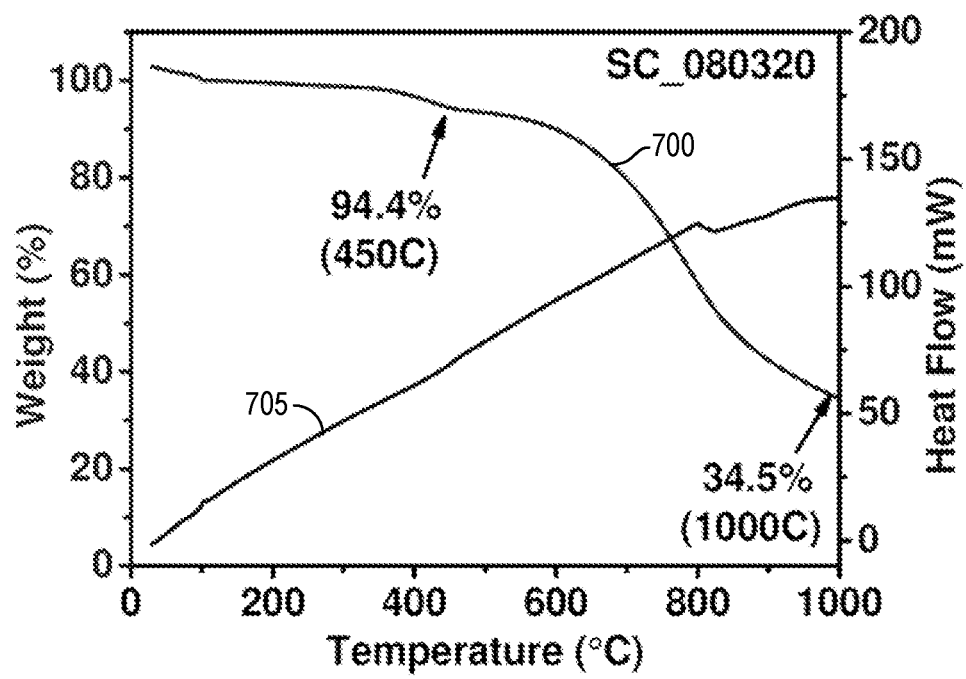
FIG. 7A depicts a TG plot 700 and DSC plot 705 of the output from step 435 of FIG. 4, the active cathode layer 300 in accordance with the embodiment of FIG. 3.

FIG. 7A depicts a TG plot 700 and DSC plot 705 of the output from step 435 of FIG. 4, the active cathode layer 300 in accordance with the embodiment of FIG. 3. With crosslinking and the subsequent heat treatment, the material retains sulfur far beyond the 300° C. of the precursor from step 450. In one example, 94.4% of the sulfur was retained up to 450° C. This demonstrates a chemical stability that prevents active cathode layers of this material from readily decomposing into polysulfides that escape into the electrolyte.

Figure 7B:
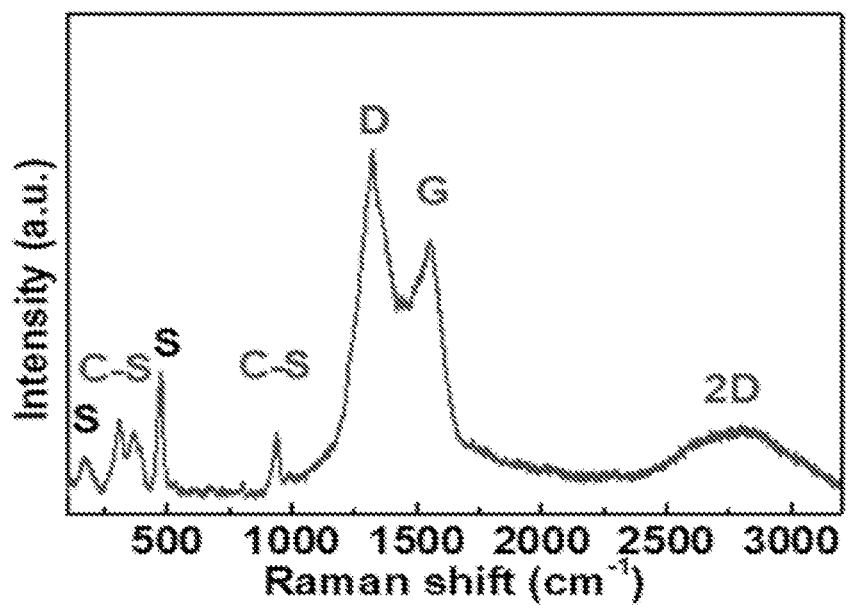
FIG. 7B is a Raman spectrum of a conductive framework of sulfurized carbon showing carbon sulfur (C—S) peaks, sulfur (S) peaks, D, G, and 2D peaks.

FIG. 7B is a Raman spectrum of a conductive framework of sulfurized carbon showing carbon sulfur (C—S) peaks, sulfur (S) peaks, D, G, and 2D peaks. The C—S peaks are indicative of carbon-sulfur chemical bonds, due to bonding of sulfur to amorphous carbon and the carbon nanotubes of the conductive framework of sulfurized carbon. The S peaks are indicative of sulfur-sulfur chemical bonds in a sulfur chain attached to the carbon. Thus, some of the sulfur atoms are bonded to only sulfur atoms (S—S) and some are bonded to both sulfur and carbon atoms (C—S—S). The D, G, and 2D modes include contributions from the amorphous carbon and carbon nanotubes in the conductive framework of sulfurized carbon. The D mode, originating from the presence of six-membered rings, is activated by the presence of defects. The G mode confirms the sp2 carbon structure of the carbon nanotubes. The 2D mode, an overtone of the D mode, indicates the presence of six-membered rings and its shape provides structural and electronic structure about the conductive framework of sulfurized carbon. Because the 2D mode is quite noticeable relative to other peaks, it indicates the presence of clustered aromatic rings that provide conductivity in the conductive framework with sulfurized carbon. The broadness of the 2D peak confirms the amorphous carbon in the sulfurized carbon whereby sp2 carbon atoms are organized as clusters of six-membered rings that constitute a short-range order (on the order of several nanometers) before defects such as sp3 carbon, non-carbon atoms, five-membered rings, and/or seven-membered rings, are encountered.

Figure 8A:
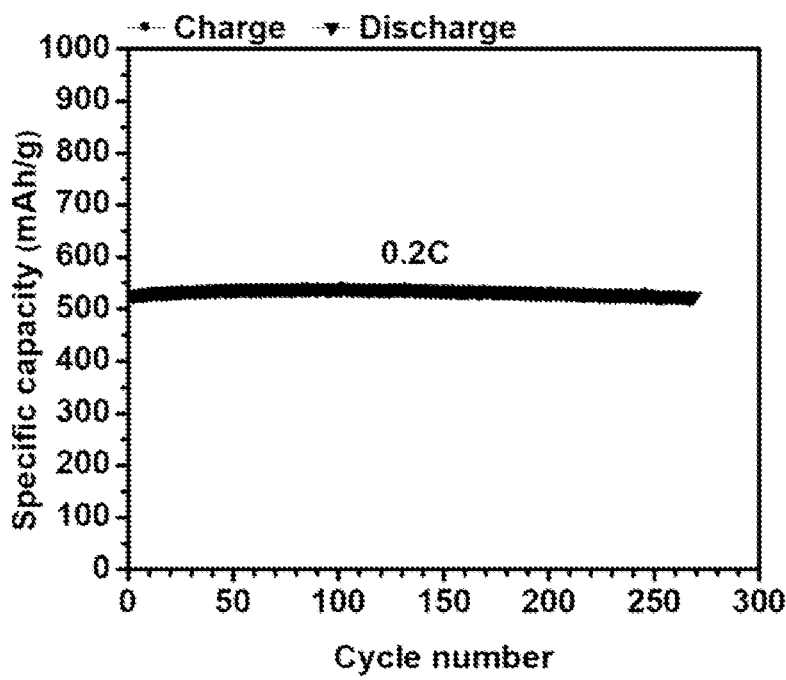
FIG. 8A plots the cycling performance (charge/discharge) of an electrode in accordance with one embodiment.

FIG. 8A plots the cycling performance (charge/discharge) of an electrode in accordance with one embodiment. In this example, the electrode material includes sulfurized carbon (active material within a sulfurized framework), carbon black (conductive additive), and polyacrylic acid (PAA binder), at a ratio of 95:5:5, coated from an aqueous (water) slurry on carbon-coated aluminum foil. In one embodiment, the carbon-coated aluminum comprises an aluminum foil 16 um thick with both sides coated with a 1 um layer of carbon of an areal density of 0.5 g/m$^2$. The carbon protects the aluminum from corrosion caused by the fluorinated electrolyte. It also promotes adhesion between the current collector and the cathode material. The gravimetric capacity (mAh/g) of the electrode is based on the mass of the active material. The mass of the electrode material is 5 mg/cm$^2$ and the areal capacity at 0.2 C is about 2.4 mAh/cm$^2$.

Figure 8B:
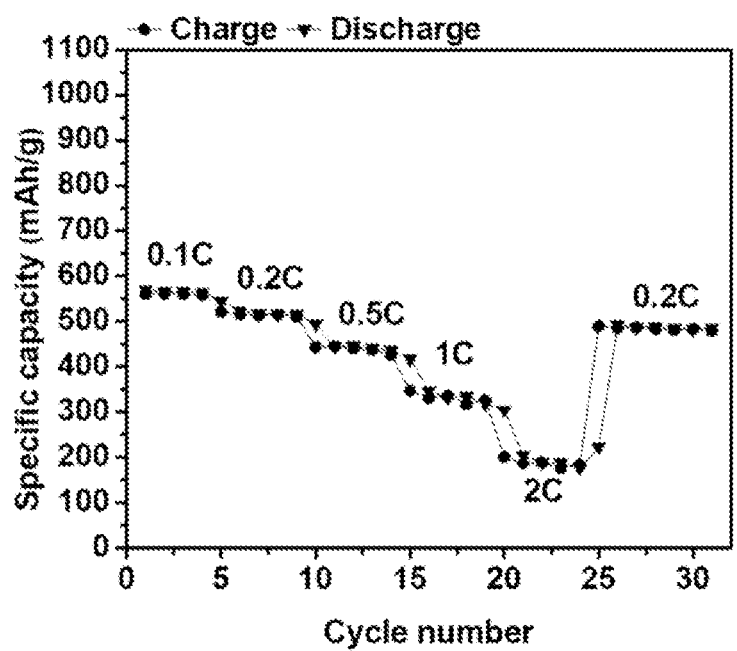
FIG. 8B plots the rate performance (charge/discharge) of an electrode (a half cell) in accordance with another embodiment.

FIG. 8B plots the rate performance (charge/discharge) of an electrode (a half cell) in accordance with another embodiment. The x axis represents charge cycles and the y axis the gravimetric capacity of the sulfurized carbon. In this example the active electrode material includes a conductive framework with sulfurized carbon, carbon black (a conductive additive), and a polyvinylidene difluoride (PVDF) binder at a ratio of 95:5:5. This composition was coated from an N-methylpyrrolidone (NMP) slurry on carbon-coated aluminum foil that will serve as current collector. The mass of the electrode material is 4.5 mg/cm$^2$ and the areal capacity at 0.2 C is about 2.2 mAh cm$^{-2}$. These data show that the gravimetric capacity of the half cell at 0.2 C recovers after repeated charge and discharge cycles at 2 C.

Figure 9:
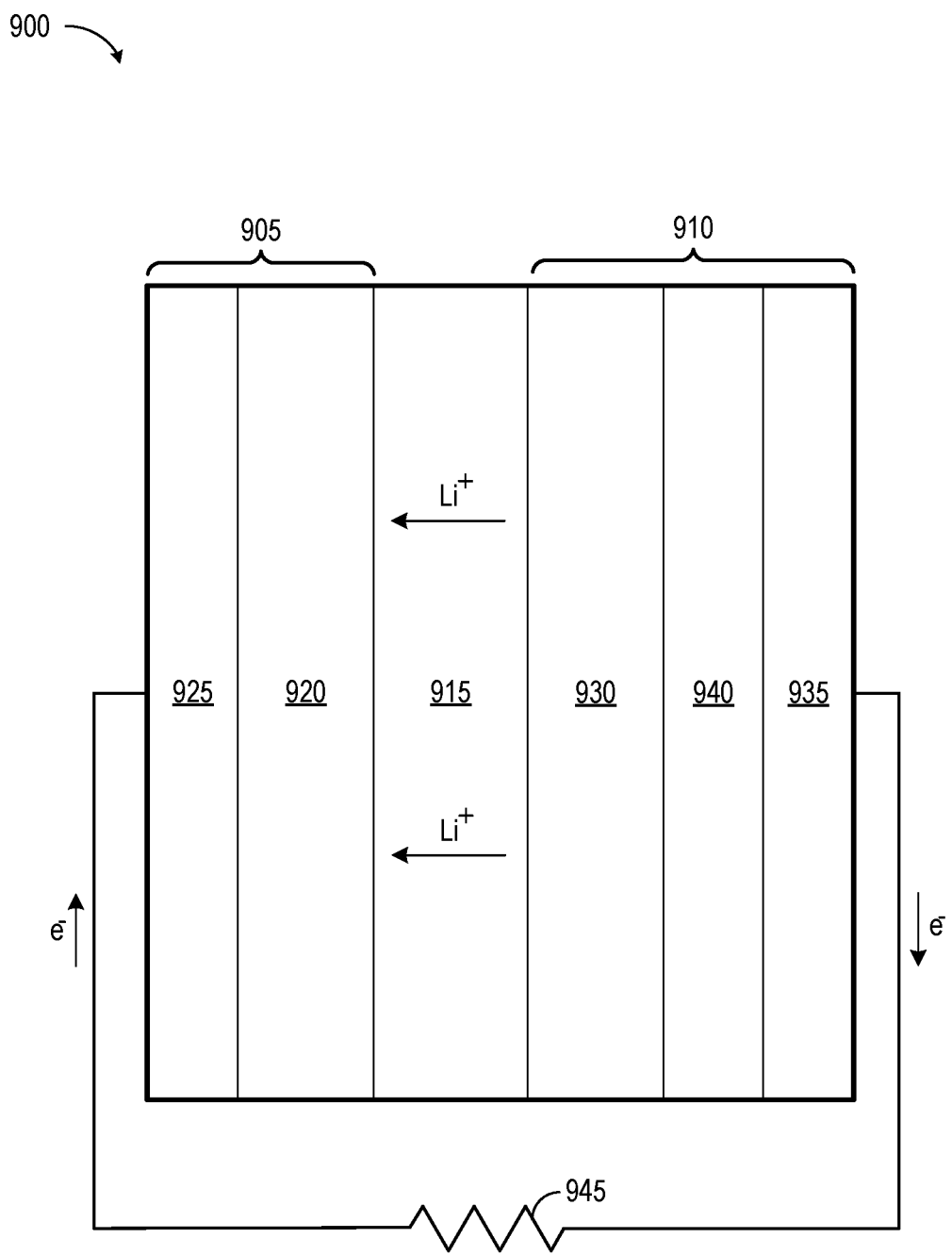
FIG. 9 depicts an energy-storage device 900, an electrochemical cell, with a cathode 905 and anode 910 separated by an electrolyte 915 and optional separator (not shown) of e.g. a porous polymer.

FIG. 9 depicts an energy-storage device 900, an electrochemical cell, with a cathode 905 and anode 910 separated by an electrolyte 915 and optional separator (not shown) of e.g. a porous polymer. Cathode 905 and anode 910 are each engineered to store relatively large quantities of lithium. Cathode 905 stores lithium in an active layer 920 that includes a conductive framework of sulfurized carbon, as detailed above, over a cathode current collector 925 of e.g. aluminum. Anode 910 stores lithium metal within and between carbon nanotubes (CNTs) of an anode active layer 930. The CNTs are grown from and secured to a copper current collector 935 using an interfacial layer 940 that includes a catalyst for CNT growth.

Electrolyte 915 can be liquid or solid. As a liquid, electrolyte 915 can be e.g. 4 M lithium bis(fluorosulfonyl) imide with a porous separator of e.g. 5 μm polyethylene. A solid electrolyte can be used to separate anode from cathode, in which case one or both active layers 920 and 930 can incorporate a liquid, paste, or jell electrolyte that facilitates ion flow between the solid electrolyte and the active materials. The electrolytes on either side of the solid electrolyte can be the same or different, depending on what best suits the anode and cathode active materials. Solid, or "solid-state," electrolytes can be inorganic (e.g. Lithium phosphorous oxynitride (LIPON), Lithium thiophosphate, or Lithium nitride) or polymer (e.g. polyethylene oxide).

Lithium-sulfur cathodes can lose sulfur when elemental sulfur reacts with the lithium ions in the electrolyte to form soluble lithium polysulfides, which are shuttled between the cathode and anode. In this deleterious process, sometimes referred to as the shuttle effect, lithiated polysulfides shuttle sulfur from the active cathode material through the electrolyte to plate onto the anode layer during charging. The shuttle effect both reduces storage capacity and increases internal resistance. Based on information and belief, and without being limited to theory, an active cathode layer 920 initially lacks or substantially lacks elemental sulfur. When device 900 is first discharged, the sulfurized carbon is reduced by lithium to form lithium sulfides. Components of electrolyte 915 also reduce within and between carbon-sulfur lumps 110 to form an SEI matrix that extends through cathode active layer 920. The SEI matrix traps the polysulfides but is an ion conductor. During charging, the SEI matrix retains the sulfur and allows lithium ions to escape back through electrolyte 915 to cathode active layer 910. The SEI matrix continues to retain the sulfur over subsequent charge/discharge cycling.

Lithium in anode active layer 930 ionizes to produce lithium ions and electrons during cell discharge. The electrons power an external load 945, passing from anode 910 to cathode 905 via current collectors 925 and 935 and the load. Simultaneously, the lithium cations (Li$^+$) pass from anode 910 to cathode 905 via electrolyte 915. Li cations from the electrolyte reduce sulfur within cathode active layer 920 and form lithium sulfide. Charging reverses this process by stripping lithium cations and electrons from cathode active layer 920 and returning them to anode active layer 930 where they electroplate the CNTs to form a layer of lithium metal over and between the CNTs.

The capacity of anode 910 is a function of the quantity of lithium metal that can be stored in active layer 930, while the electrical impedance is a function of the ease with which charge carriers—Li cations and electrons—can enter and leave. For storage, the CNT carpet has a massive areal density, on the order of hundreds or thousands of square meters per gram, that is available for Li plating, yielding lithium storage capacities (Li mass/CNT mass) of hundreds or thousands of wt %. As for ion impedance, the CNTs extend generally in parallel from interfacial layer 940 so the paths in and out of layer 930 are relatively short and straight. The electron paths are also of low impedance. CNTs are excellent conductors, as are the copper and copper alloys of current collector 935 and interfacial layer 940. The interfaces between the layers of anode 910 are low-resistance, ohmic contacts that allow charge to flow easily in both directions.

Current collector 935 is or includes a base layer predominantly of copper. In one embodiment, current collector 935 is an 8 um copper foil that is 99.9% pure. Interfacial layer 940, formed during the manufacture of anode 910, is of a copper alloy with precipitate particles that catalyze and anchor the CNTs of anode active layer 930. Interfacial layer 940 can include other elements, such as oxygen, that may or may not catalyze CNT growth. The oxygen may come from native or grown surface copper oxide. The other elements may include metals, such as Ag, Ni, Cr, Al, Fe, Zn. The other elements may come from unintentional native or manufacturing trace impurities or they may be intentionally introduced. The other elements may or may not catalyze CNT growth. In one embodiment, the other elements are less than 20 wt. % of the copper surface. Based on information and belief, the CNTs have root structures that extend out of interfacial layer 940 from the catalyst precipitate particles and establish strong connections with beneficially low thermal and electrical impedance supported by metallic and covalent bonds.

Figure 10:
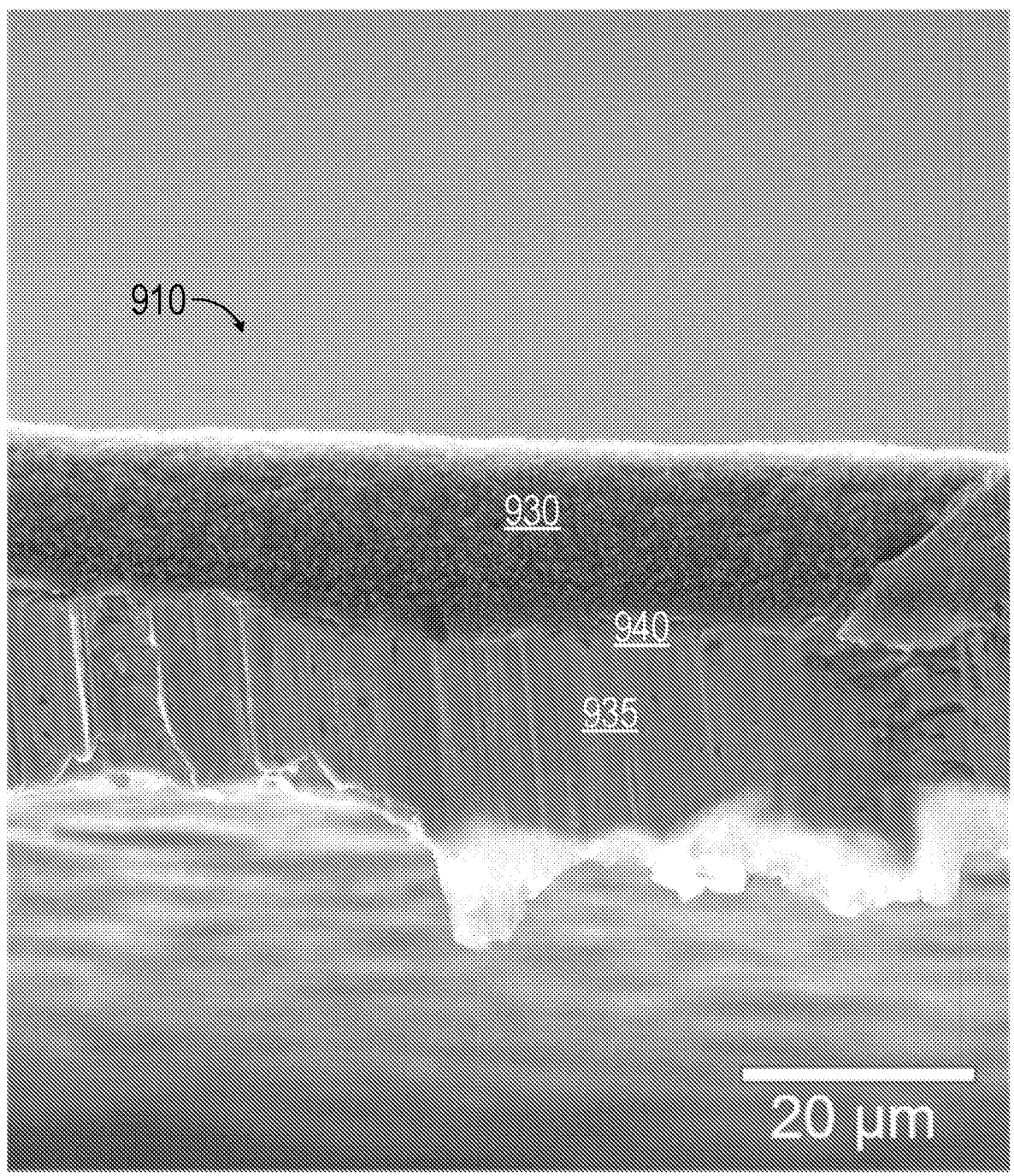
FIG. 10 is a scanning electron microscope (SEM) image of anode 910 in cross section.

FIG. 10 is a scanning electron microscope (SEM) image of anode 910 in cross section. Interfacial layer 940 between current collector 935 and the active anode layer 930 is difficult to see. The gray area above the CNT carpet of active layer 930 is empty space but would be filled with electrolyte in an assembled cell. The term "active" refers to the material in contact with the electrolyte that exchanges lithium ions.

Figure 11:
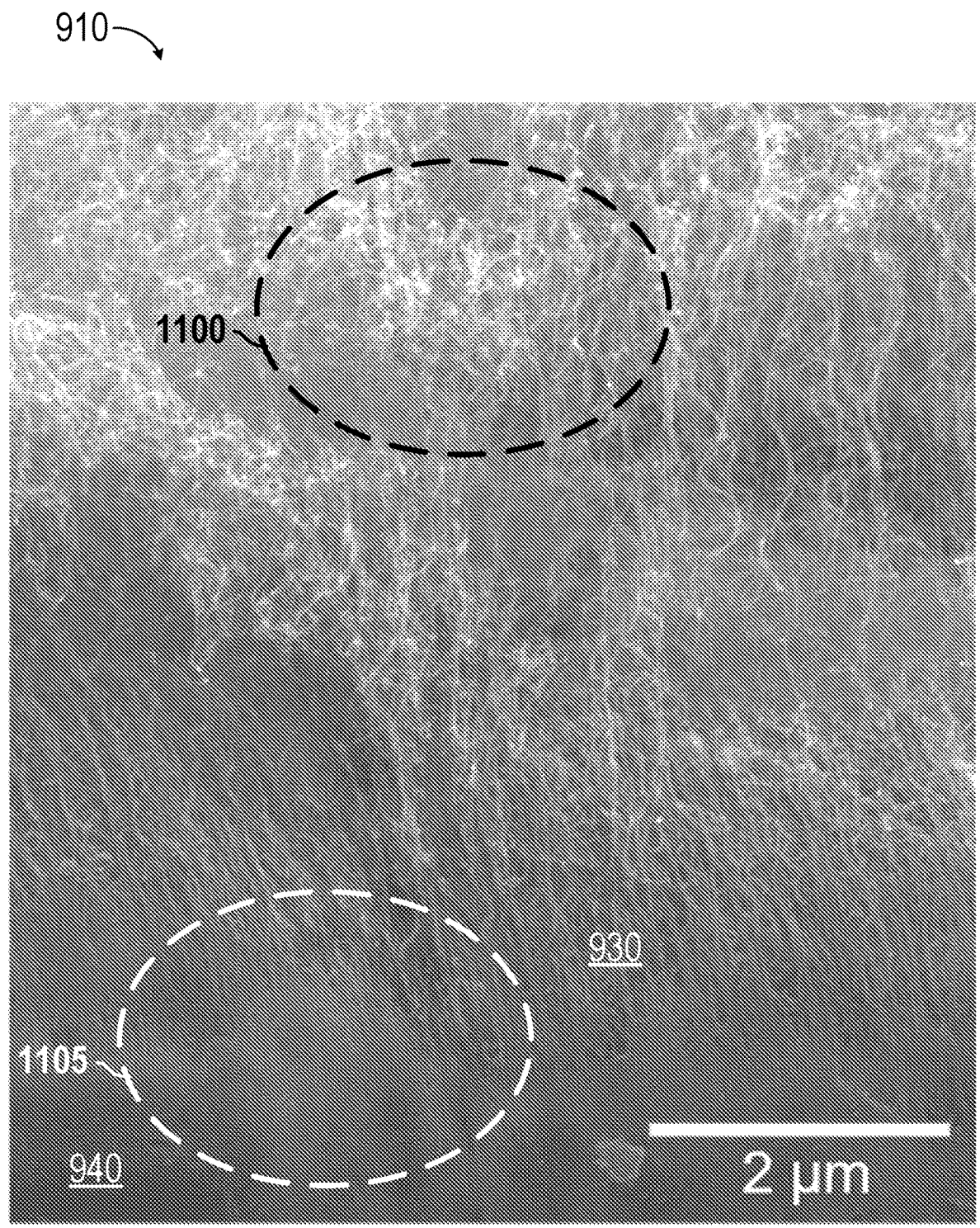
FIG. 11 is a SEM image of anode 910 at a level of magnification that resolves individual CNTs 1100 and a root area 1105 where the CNTs of layer 930 connect to interfacial layer 940.

FIG. 11 is a SEM image of anode 910 at a level of magnification that resolves individual CNTs 1100 and a root area 1105 where the CNTs of layer 930 connect to interfacial layer 940.

Figure 12:
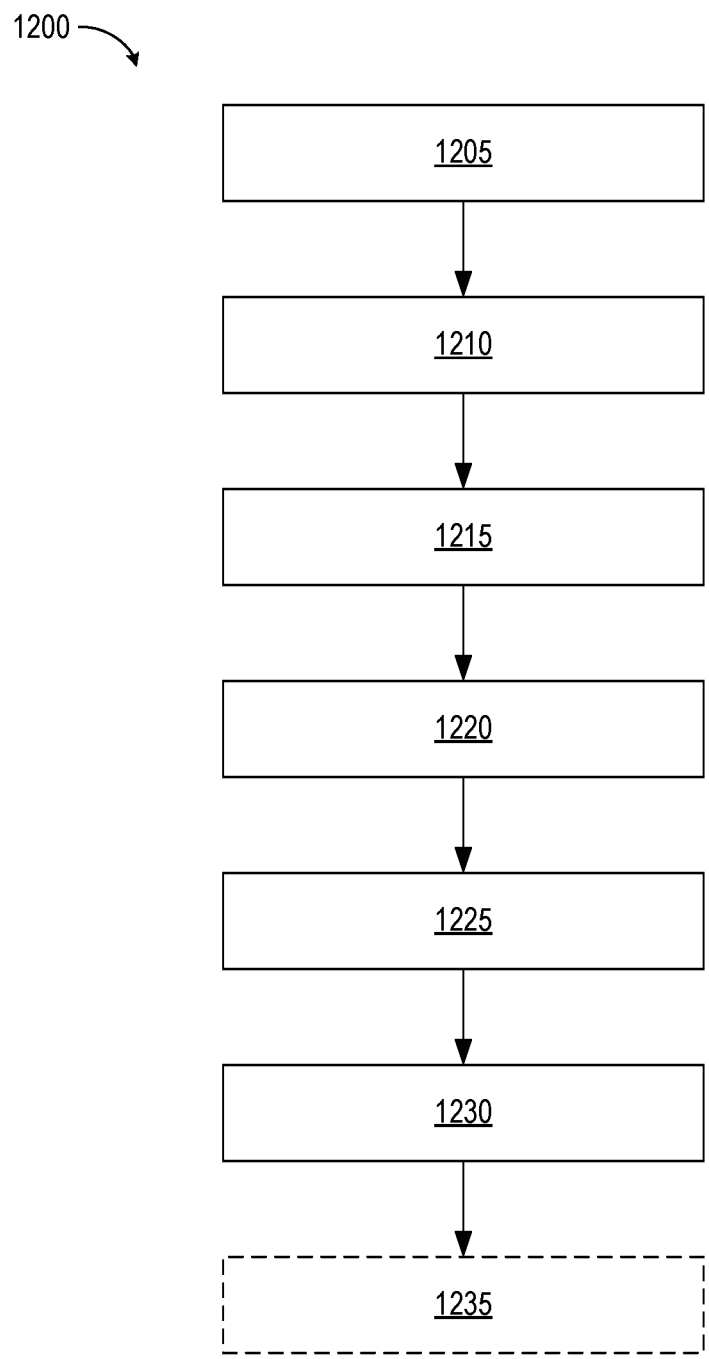
FIG. 12 is a flowchart 1200 illustrating a method of making anode 910 in accordance with one embodiment.

FIG. 12 is a flowchart 1200 illustrating a method of making anode 910 in accordance with one embodiment. First, an iron layer about 5 nm thick is deposited on a 25 μm copper foil via e.g. e-beam evaporation from an iron target at a pressure of about $5 \times 10^{-6}$ mBar (step 1205). Later in the process, as detailed below, the iron from step 1205 is incorporated into the underlying copper to form precipitate CNT nucleation cites. Iron layers less than 1 nm thick do not, for this recipe, include enough iron to produce the desired quantity and density of nucleation cites. The thickness of the iron layer is between three and fifteen nanometers in this recipe. CNT catalysts other than iron, such as nickel, can be use with or instead of iron. In this context, a CNT catalyst is any material that catalyzes CNT growth.

Next, an aluminum oxide layer about three nanometers thick was deposited over the iron layer via e-beam evaporation from an aluminum oxide target at a pressure of about $1.6 \times 10^{-4}$ mBar (step 1210). The aluminum oxide layer protects and constrains the CNT growth so that the CNTs grow in parallel from the interfacial layer. Aluminum oxide layers much below three nanometers fail to support adequate CNT growth in this example.

In some embodiments, the catalyst and buffer layers are deposited by one or more of e-beam evaporation, sputtering, thermal evaporation, atomic layer deposition, molecular beam epitaxy, electrodeposition, solution-phase deposition, nanoparticle deposition.

In step 1215, the copper foil with catalyst and protective layers is inserted into a load-lock chamber of a three-chamber tubular reactor and the reactor is prepared for CNT growth. The reactor (not shown) includes a loading chamber, a cold zone, and a hot (growth) zone. The load-lock chamber, with its own pumping and venting systems, is separated from the cold and hot zones of the reactor by a gate valve, while the cold zone is between the load lock chamber and the hot zone. The hot zone is the part of the reactor directly under the furnace, while the cold zone is outside of the furnace. Both hot and cold zones can share the same pumping system. The hot zone is pre-heated to 750° C. under a mass flow rate of 4 sccm acetylene, 200 sccm hydrogen, and 200 sccm hydrogen bubbled through a water cylinder to give a precursor mixture of a CNT source gas with a total pressure of about 10 Torr. The coated Cu foil substrate is introduced to and evacuated in the load-lock chamber using a vacuum pump down to a pressure below 0.1 Torr.

The gas precursor mixture is activated (step 1220) using a heated tungsten filament located in the hot zone, which is Joule heated to a temperature of about 2000° C. by a supply of about 30 W of electrical power from a power supply (step 1220). Then the gate valve is opened and the substrate transported into the hot zone of the reactor via the cold zone. The tungsten filament produces a characteristic amber glow, indicating activation of an ambient gas mixture of acetylene, hydrogen, and water into various hydrocarbon, hydrogen, oxygen, and hydroxyl radicals and neutral fragments, such as atomic hydrogen, acetylene radical. After about 30 seconds of introducing the substrate to the hot zone, the tungsten filament is powered off. During the 30 seconds of exposure, the substrate interacts with the thermal energy and activated chemical species generated by the heated tungsten filament.

In step 1220, during the exposure of the substrate to the activated gas precursor, the heat from the tungsten filament further increases the temperature of the substrate above 750° C. for e.g. 30 seconds. This thermal treatment diffuses the iron into the copper to create a copper-iron interfacial layer. The iron dissolving in the underlying copper eventually saturates the copper and forms precipitate CNT nucleation cites. Thus, the substrate generated after the exposure of step 1220 includes copper from the initial foil overlayed with a copper-iron interface, an iron catalyst layer, and a buffer layer of aluminum oxide at the surface. The interfacial layer is between about five and twenty nanometers, though these layers are not sharply divided; rather, the interfacial concentration of iron is relatively high—e.g. the material predominantly of iron—and decreases into the bulk of the copper.

Next, in step 1225, the tungsten filament heater is turned off and the CNTs grown using a carbon source gas (e.g. acetylene) and for a time that depends on the desired properties of the CNT carpet, ten minutes for a CNT carpet with a height of about 20 μm and an areal mass of about 0.1-0.3 mg/cm$^2$. The areal mass can be decreased below about 0.1-0.3 mg/cm$^2$ or increased above 0.1-0.3 mg/cm$^2$ by decreasing or increasing, respectively, the catalyst thickness, CNT growth time, total pressure, and/or carbon source concentration or partial pressure. In this example, the source gases are the same for both steps 1220 and 1225. During CNT growth, the continuous copper-iron interface atop the predominantly copper substrate predominantly immobilizes the surface iron at the base of the carbon nanotube carpet, while some of the aluminum oxide buffer layer may be present at the interface or lifted with the top of the carbon nanotube carpet as the CNTs grow from the interfacial layer nucleated and catalyzed by the iron precipitates. Some of the iron may also be lifted with the grown carbon nanotube carpet. The anode structure is then removed from the hot zone to the cold zone to rapidly cool e.g. with the aid of a fan (step 1230). In an optional step 1235, lithium metal can be deposited or plated onto the CNT layer.

Some embodiments employ a catalyst layer of iron (e.g. 5 nm) on copper without a buffer layer of e.g. aluminum oxide. In one such embodiment, the iron layer is overlayed with iron oxide (e.g. 3 nm), the latter taking the place of aluminum oxide. In another embodiment, iron (e.g. 5 nm) is covered with aluminum oxide (e.g. 3 nm). In yet another embodiment, iron and iron-oxide layer (e.g. 5 nm) are covered with aluminum oxide (e.g. 3 nm). Some further embodiments layer iron oxide (e.g. 5 nm) directly over the copper.

In step 1225, CNT length can be increased by increasing process time, pressure, or both. The morphology of the CNT carpet can be controlled by adjusting the electrical power applied to the tungsten filament during the alloy formation/ nucleation step 1220. The density of the CNT carpet can be controlled by adjusting the duration of exposure of the substrate to the heated tungsten filament. Other growth parameters being equal, increasing the exposure time from 30 seconds to one minute decreased the CNT carpet density.

In another embodiment of the CNT growth process, the tungsten filament treatment described above is omitted when the catalyzed copper foil is inserted into the hot zone of the reactor at 750° C. Even without the tungsten filament treatment, diffusion of the iron into the copper occurs to create a copper-iron interfacial layer. The iron dissolving in the underlying copper eventually saturates the copper and forms precipitate CNT nucleation cites. Thus, the substrate generated after the thermal exposure includes copper from the initial foil overlayed with a copper-iron interface, an iron catalyst layer, and a buffer layer of aluminum oxide at the surface. The interfacial layer is between about five and twenty nanometers, though these layers are not sharply divided; rather, the interfacial concentration of iron is relatively high—e.g. the material predominantly of iron—and decreases into the bulk of the copper.

In other embodiments of the CNT growth process, the growth temperature is between 550° C. and 700° C. In another embodiment of the process, the copper is catalyzed on both sides for dual-sided growth of CNT. The catalyzed copper can be suspended in the reactor, without sitting on a platform and only held at the edges, thus facilitating simultaneous growth of CNT on both sides of the copper. A tension or force can be applied at the edges of the copper to move it through the reactor.

In another embodiment, the catalyzed copper is vertically oriented in the reactor, facilitating simultaneous growth of CNT on both sides of the copper.

The foregoing method of making an electrode is not limiting. Other discrete or continuous processes can also be used. In one embodiment, for example, the discrete process of FIG. 12 is adapted to a roll-to-roll process in which the active material is formed on one or both sides of rolled metal (e.g. copper) foil.

Figure 13:
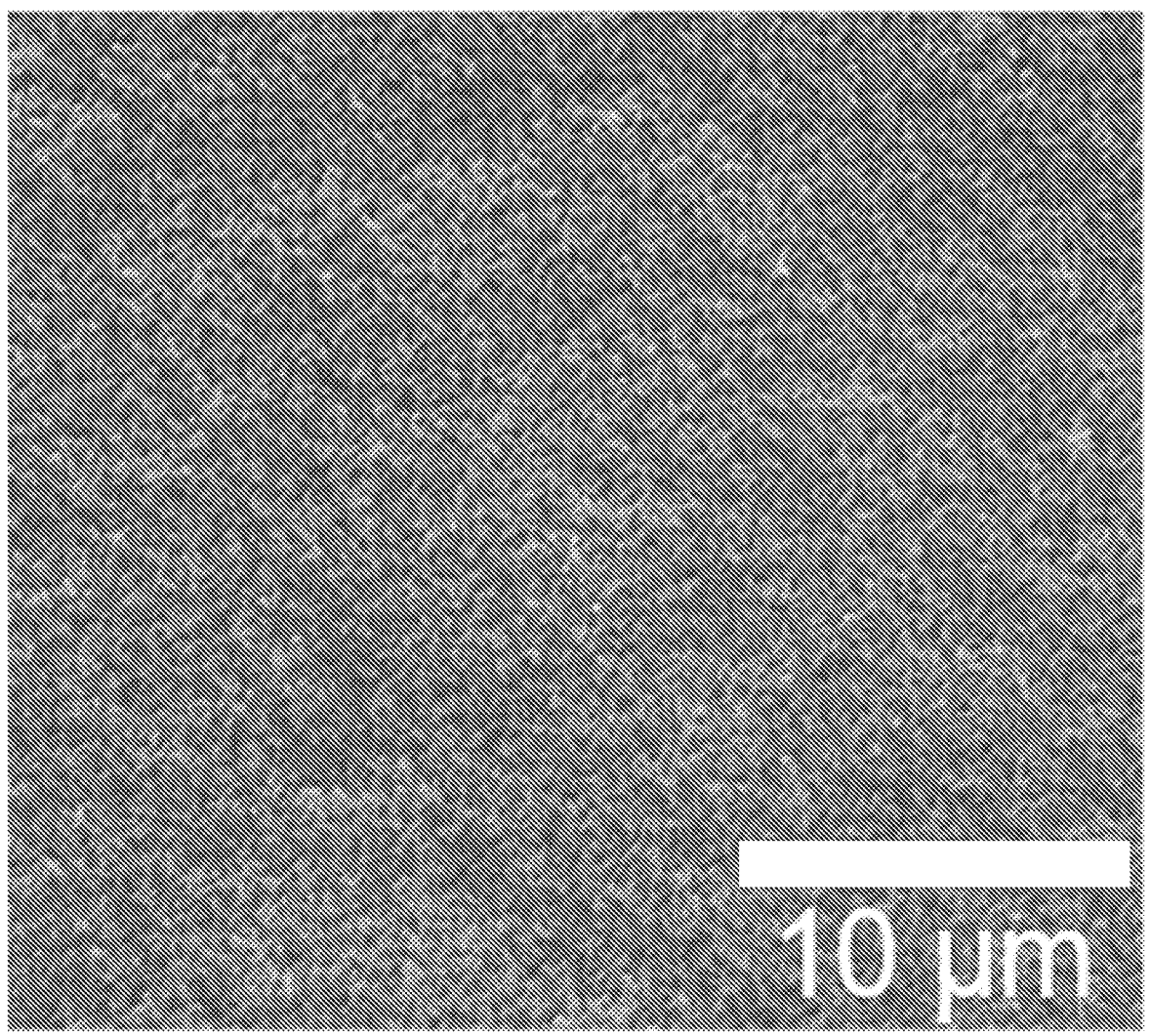
FIG. 13 is an SEM image of the active portion of a CNT carpet 1300 grown using a tungsten filament power of 30 W and exposure time of 30 seconds, followed by a CNT growth time of 10 minutes.

FIG. 13 is an SEM image of the active portion of a CNT carpet 1300 grown using a tungsten filament power of 30 W and exposure time of 30 seconds, followed by a CNT growth time of 10 minutes.

Figure 14:
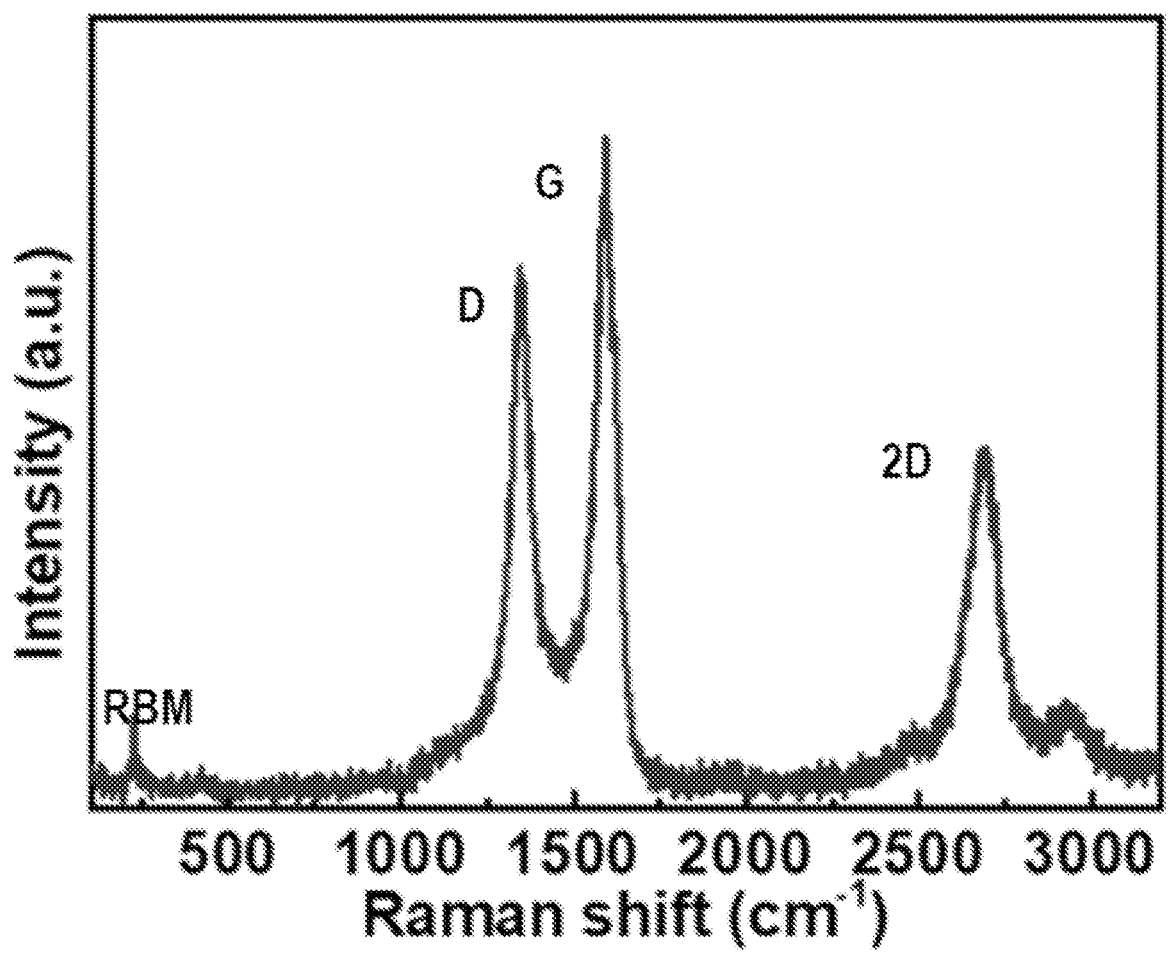
FIG. 14 is a Raman spectrum of a carbon nanotube carpet showing RBM, D, G, and 2D modes at about 200 $cm^{-1}$, 250 $cm^{-1}$, 480 $cm^{-1}$, and 2700 $cm^{-1}$.

FIG. 14 is a Raman spectrum of a carbon nanotube carpet showing RBM, D, G, and 2D modes at about 200 cm$^{-1}$, 250 cm$^{-1}$, 480 cm$^{-1}$, and 2700 cm$^{-1}$. The RBM (radial breathing mode) is indicative of single-walled carbon nanotubes. D mode, originating from the presence of six-membered rings, is activated by the presence of defects. G mode confirms the sp2 carbon structure of the carbon nanotubes. The 2D mode, an overtone of the D mode, indicates the presence of six-membered rings and well-developed electronic structure and conductivity of the carbon nanotubes.

Figure 15:
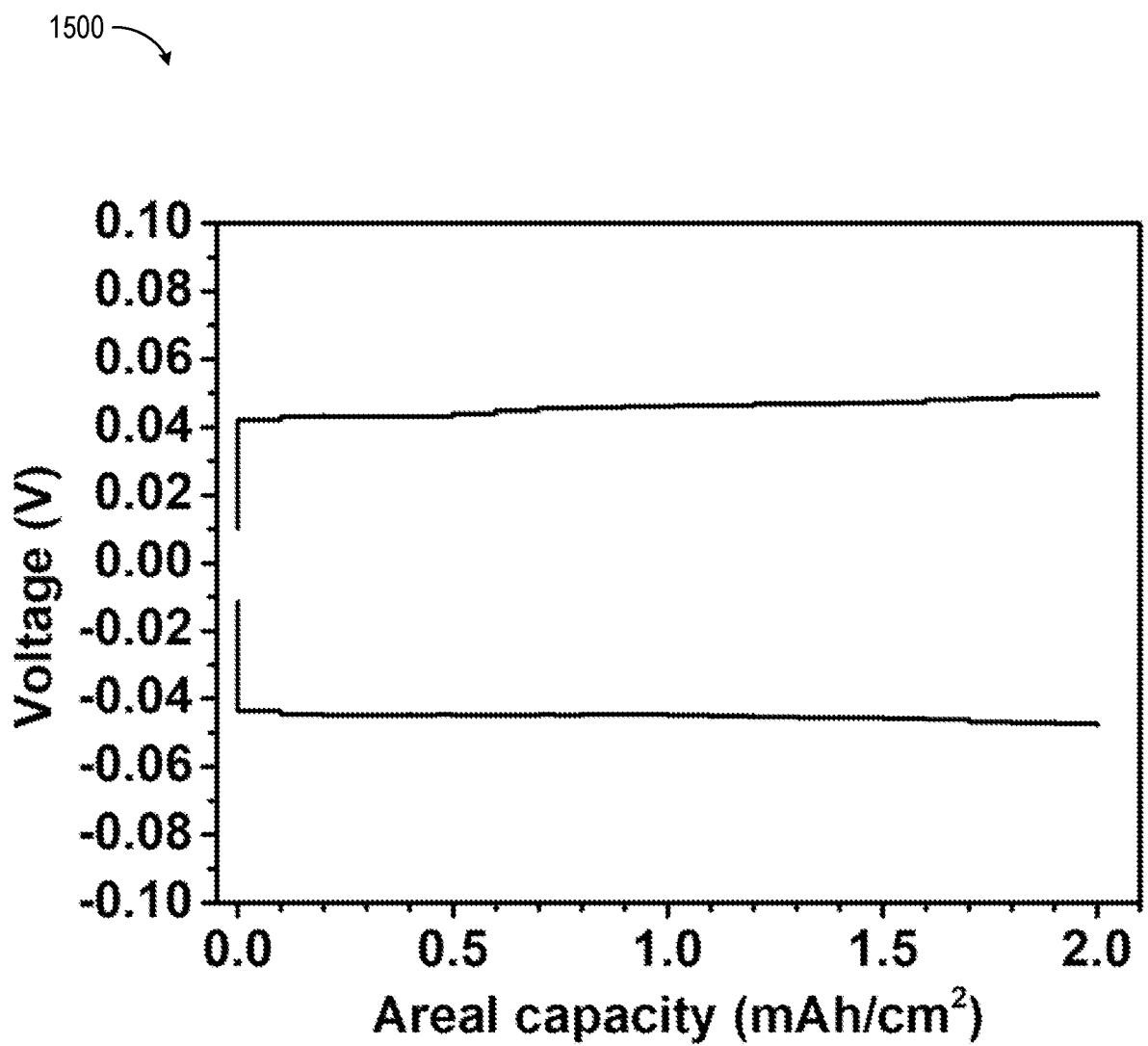
FIG. 15 is a plot 1500 of charge/discharge curves showing electrochemical plating and stripping of Li-metal over and between carbon nanotubes at a current density of about 1 $mA/cm^2$ or a rate of about 0.5 C.

FIG. 15 is a plot 1500 of charge/discharge curves showing electrochemical plating and stripping of Li-metal over and between carbon nanotubes at a current density of about 1 mA/cm$^2$ or a rate of about 0.5 C. The electrode area is about 2 cm$^2$. The test subject, a CNT carpet grown on copper in the manner described above, was placed inside a standard 2032 coin cell with a Li metal chip as a counter and reference electrode, a 5 μm polyethylene separator, and a 4 M lithium bis(fluorosulfonyl)imide electrolyte.

Figure 16:
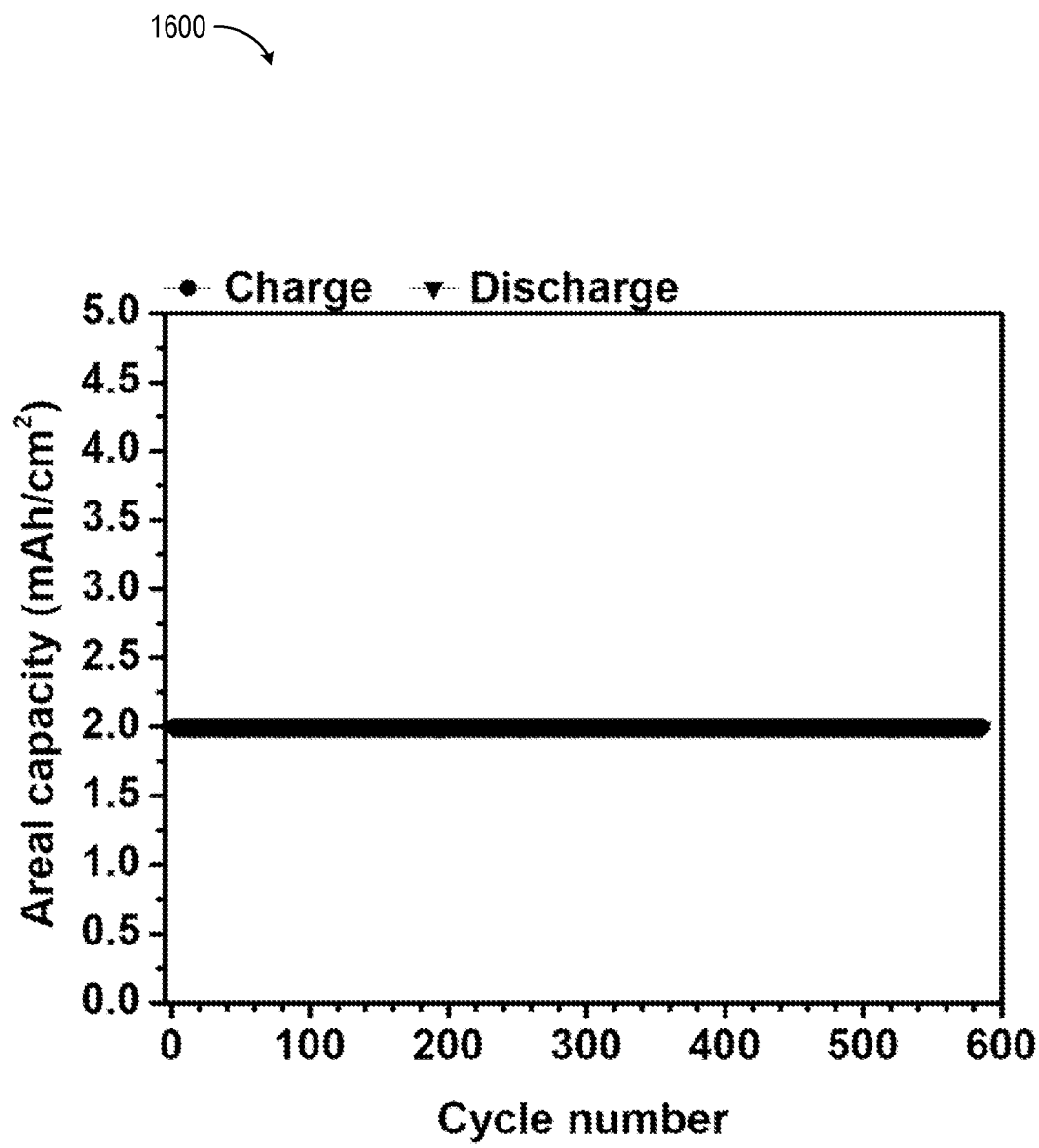
FIG. 16 is a plot 1600 of a cycling experiment showing stable cycling of a Li-metal plated carbon nanotube carpet at a capacity of about 2 $mAh/cm^2$, a current density of about 1 $mA/cm^2$ or a rate of about 0.5 C.

FIG. 16 is a plot 1600 of a cycling experiment showing stable cycling of a Li-metal plated carbon nanotube carpet at a capacity of about 2 mAh/cm$^2$, a current density of about 1 mA/cm$^2$ or a rate of about 0.5 C. The electrode area is about 2 cm$^2$.

Figure 17:
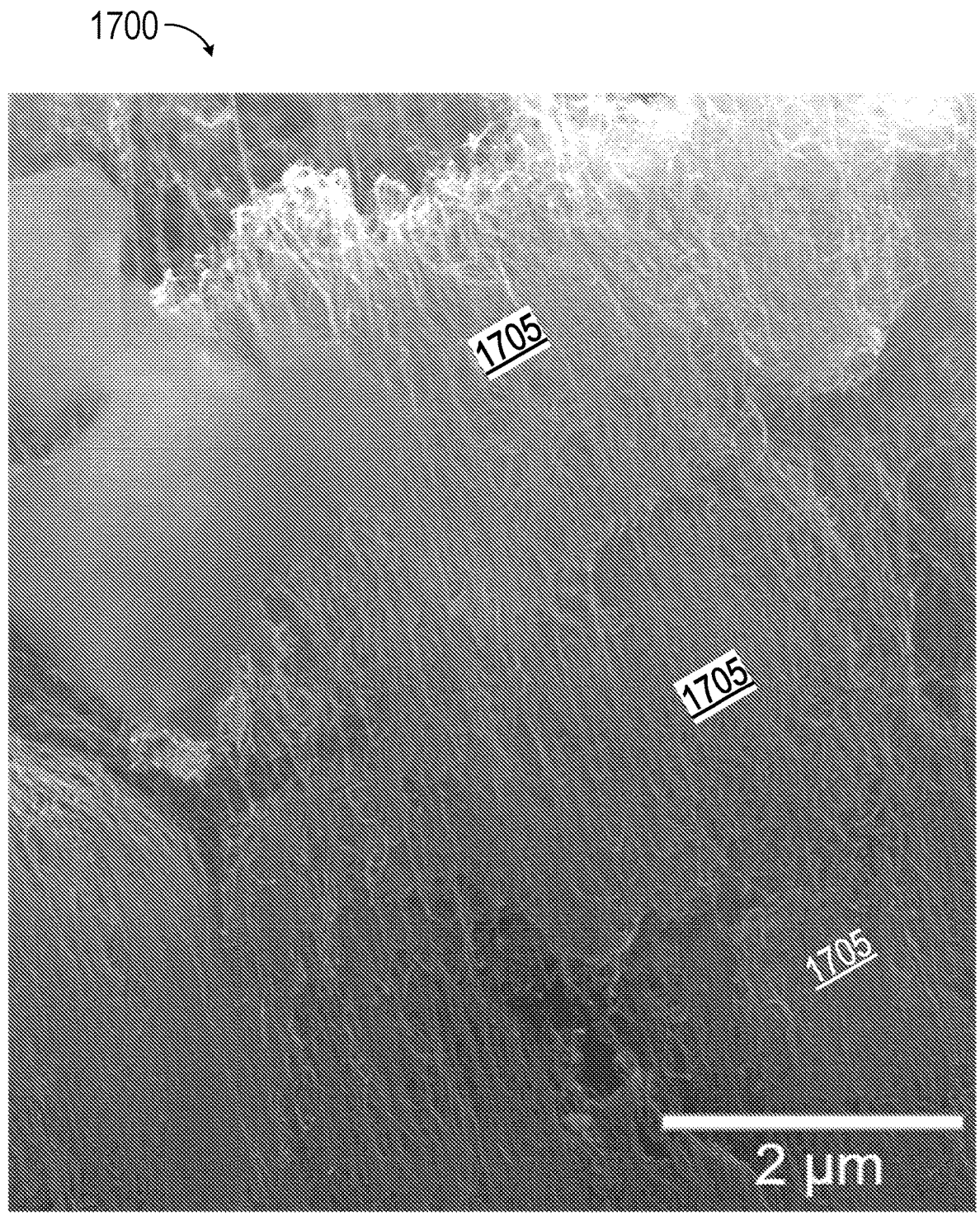
FIG. 17 is an SEM image of a side-view of an active electrode surface 1700 with multiple layers of CNT carpets 1705 on top of one another.

FIG. 17 is an SEM image of a side-view of an active electrode surface 1700 with multiple layers of CNT carpets 1705 on top of one another. Surface 1700 was grown with a tungsten filament power of 50 W over an exposure time of 30 seconds followed by a CNT growth time of 10 minutes.

Figure 18:
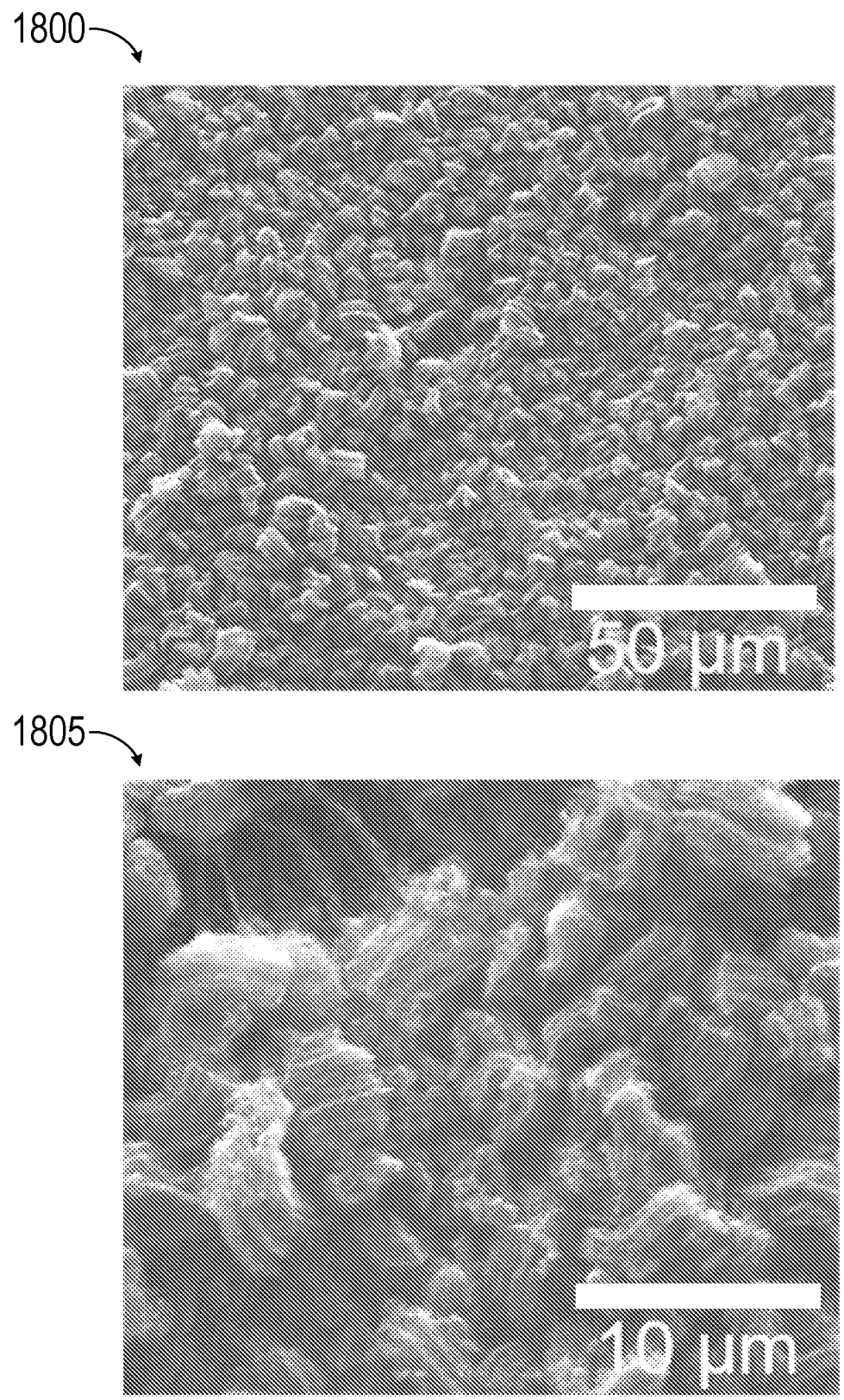
FIG. 18 includes two SEM images 1800 and 1805 of the active portion of a CNT carpet grown using a tungsten filament power of 50 W and exposure time of 30 seconds, followed by a CNT growth time of 10 minutes.

FIG. 18 includes two SEM images 1800 and 1805 of the active portion of a CNT carpet grown using a tungsten filament power of 50 W and exposure time of 30 seconds, followed by a CNT growth time of 10 minutes. Images 1800 and 1805 are of the same material but taken at different levels of magnification.

Figure 19:
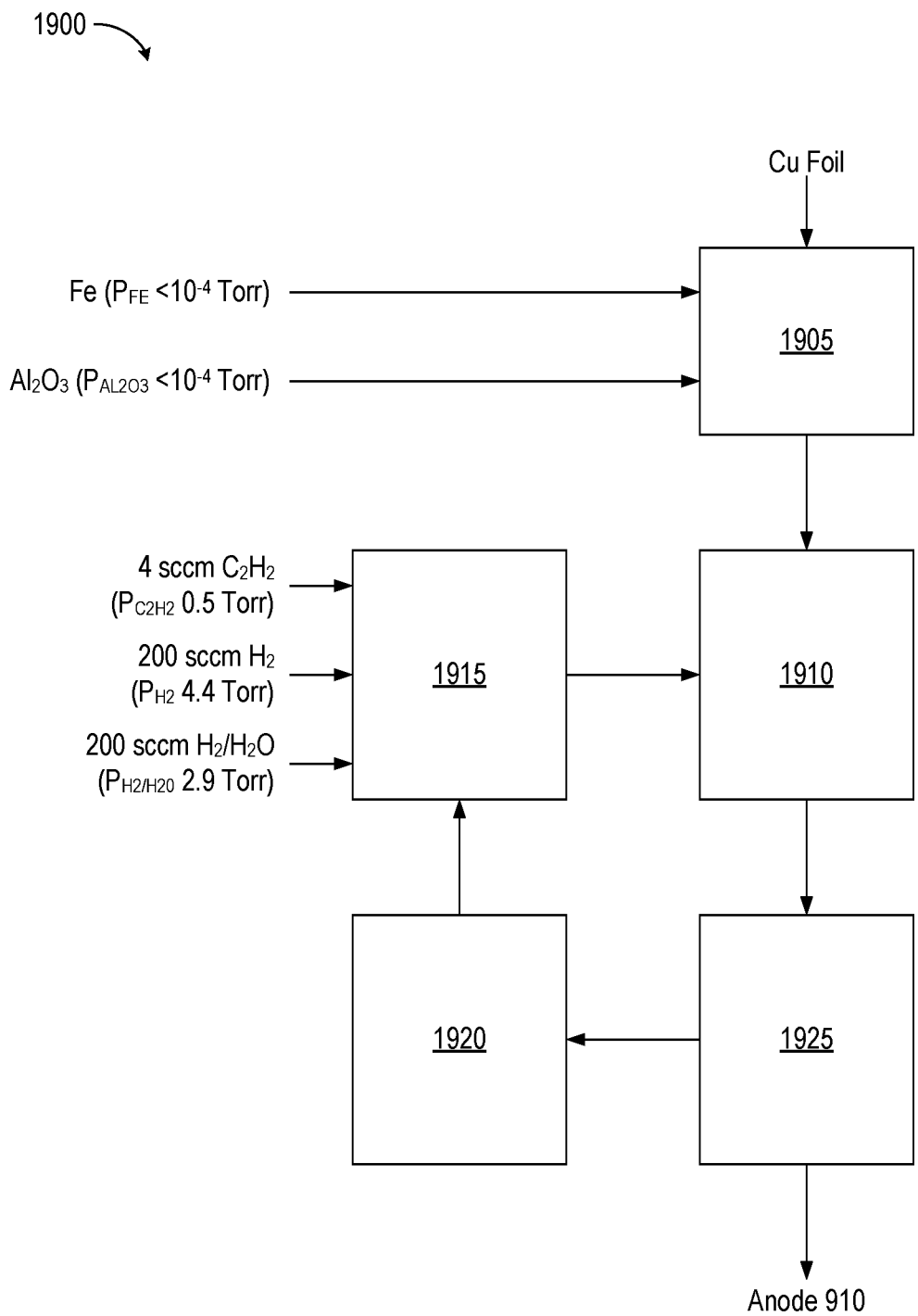
FIG. 19 depicts a system 1900 for forming anode 910 of FIG. 9 following a process similar to that detailed above in connection with FIG. 12.

FIG. 19 depicts a system 1900 for forming anode 910 of FIG. 9 following a process similar to that detailed above in connection with FIG. 12. An E-beam evaporator 1905 running at 10 kW is used to successively deposit first iron then alumina, each at a vapor pressure of less than 10$^{-4}$ Torr, on a copper foil. The resulting substrate is moved to a reactor/furnace 1910, a tube that is 2.54 cm in diameter, to undergo a chemical-vapor-deposition (CVD) process at 750° C.

A heated pipe 1915, heated to 100° C., preheats reactants for reactor/furnace 1910. In this example, the reactants are acetylene at 4 sccm at 0.5 Torr, hydrogen at 200 sccm and 4.4 Torr, and a combination of hydrogen and water at 200 sccm and 2.9 Torr. Reactor/furnace 1910 includes a loading chamber, a cold zone, and a hot (growth) zone. The load-lock chamber, with its own pumping and venting systems, is separated from the cold and hot zones of the reactor by a gate valve, while the cold zone is between the load lock chamber and the hot zone. The hot zone is the part of the reactor directly under the furnace, while the cold zone is outside of the furnace, and both hot and cold zones share the same pumping system.

The hot zone is pre-heated to 750° C. under a mass flow rate of 4 sccm acetylene, 200 sccm hydrogen, and 200 sccm hydrogen bubbled through a water cylinder to give a total pressure of about eight to ten Torr. A copper foil coated with catalyst and buffer layers is introduced into reactor/furnace 1910 and evacuated in the load lock chamber using a vacuum pump 1920 down to a pressure below 0.1 Torr. A tungsten filament in the hot zone is Joule heated to a temperature of about 2,000° C. by a supply of about 30 W. The tungsten filament activates the ambient gas mixture of acetylene, hydrogen, and water into various hydrocarbon, hydrogen, oxygen, and hydroxyl radicals and neutral fragments, such as atomic hydrogen, acetylene radical. The foil substrate is moved to the hot zone while the filament is powered.

The tungsten filament is powered off after about 30 seconds of introducing the substrate to the hot zone. During the 30 seconds of exposure, the substrate interacts with the thermal energy and activated chemical species generated by the heated tungsten filament. The heat from the tungsten filament further increases the temperature of the substrate above 750° C. This thermal treatment diffuses the iron into the copper to create a copper-iron interfacial layer. The iron dissolving in the underlying copper eventually saturates the copper and forms precipitate CNT nucleation cites. Next, in the same zone but with the tungsten filament powered down, a CNT carpet is grown from the interfacial layer. The resultant anode 910, unspent reactants, and reaction byproducts are conveyed to a cooling tube 1925. Vacuum pump 1920 removes the unspent reactants and reaction byproducts (collectively the "effluent") and returns them to heated pipe 1915 for recycling. The cooled anode 910 is then removed from the system.

Anodes of the type detailed above can be used with sulfur-based cathodes. Conventional lithium-sulfur batteries are notable for their high specific energy but suffer relatively short cycle lives that have limited adoption. Cells in accordance with some embodiments combine a high-capacity anode with a highly stable sulfurized-carbon cathode.

Many variations and modifications of the structures, methods, and materials disclosed herein are possible and are within the scope of the invention. For example, the CNT material employed as the active portion of an anode in an electrochemical cell could also be used in other high-surface-area applications, such as VANTABLACK coatings or other electrodes for electrochemical cells or capacitors.

The CNT carpets and methods for growing them provide for material, electrodes, energy-storage devices, and methods according to any of the following numbered clauses:

1. An electrode comprising:
    a base layer predominantly of copper at a first concentration.
    an interfacial layer on the base layer, the interfacial layer including copper at a second concentration and a carbon-nanotube catalyst; and carbon nanotubes from the interfacial layer.
2. The electrode of clause 1, wherein the interfacial layer comprises an alloy of the copper at the second concentration and iron.
3. The electrode of clause 2, wherein the carbon-nanotube catalyst includes precipitates of the iron.
4. The electrode of clause 3, wherein the carbon nanotubes extend from the precipitates of the iron.
5. The electrode of clause 1, wherein the second concentration is lower than the first concentration
6. The electrode of clause 1, the interfacial layer including a catalyst layer opposite the base layer.
7. The electrode of clause 6, wherein the catalyst layer is predominantly of a metal other than copper.
8. The electrode of clause 7, wherein the metal other than copper comprises iron.
9. The electrode of clause 1, wherein the interfacial layer is of a thickness between three and twenty nanometers.
10. The electrode of clause 1, the carbon nanotubes further comprising a second metal.
11. The electrode of clause 10, wherein the second metal comprises aluminum.
12. The electrode of clause 10, wherein the second metal is of a concentration in the carbon nanotubes that varies in proportion to a distance from the interfacial layer.
14. The electrode of clause 1, wherein the carbon-nanotube catalyst is of a metal with an interfacial concentration in the interfacial layer and a lower concentration in the base layer.
15. The electrode of clause 1, wherein the interfacial layer is in ohmic contact with the base layer.
16. The electrode of clause 4, wherein the interfacial layer is in ohmic contact with the carbon nanotubes.
17. The electrode of clause 1, wherein most of the carbon nanotubes are bonded to the interfacial layer by at least one metallic bond.
18. The electrode of clause 1, further comprising a substrate supporting the base layer opposite the interfacial layer.
19. The electrode of clause 1, wherein the copper surface includes a native or grown copper oxide layer.
20. The electrode of clause 1, wherein the copper surface comprises other elements constituting less than 20 wt. % of the copper surface.
21. A method of forming nanotubes on an electrode comprising a base layer predominantly of copper, a catalyst layer of a nanotube catalyst on the base layer, and a protective layer over the catalyst layer, the method comprising:
    exposing the protective layer to a nanotube source gas;
    heating the electrode, the heating producing an interfacial layer on the base layer, the interfacial layer comprising an alloy of the copper and the nanotube catalyst; and growing the nanotubes between the interfacial layer and the protective layer.
22. The method of clause 21, the nanotubes lifting the protective layer from the interfacial layer in consequence of the growing.
23. The method of clause 21, further comprising obtaining the electrode by forming the catalyst layer over the base layer and forming the protective layer over the catalyst layer.
24. The method of clause 21, wherein the catalyst layer comprises iron.
25. The method of clause 21, wherein the protective layer comprises an oxide of aluminum.
26. The method of clause 21, further comprising absorbing the protective layer into the nanotubes during the growing.
27. The method of clause 21, wherein the nanotube are carbon nanotubes.

Figure 20:
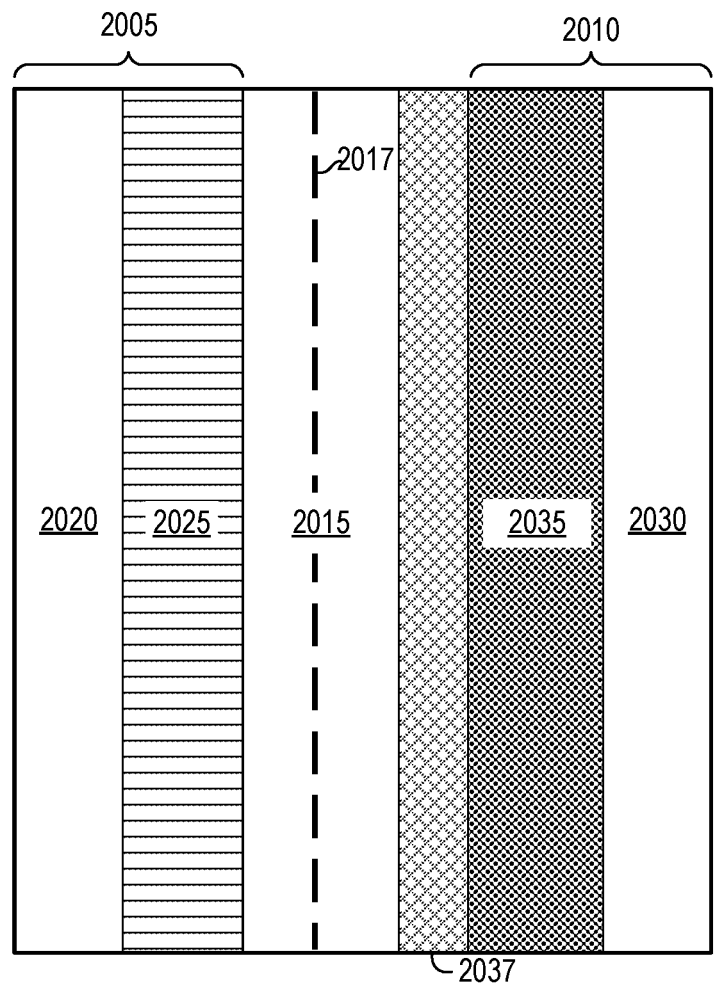
FIG. 20 depicts a stable, high-capacity, rechargeable energy storage cell 2000.

FIG. 20 depicts a stable, high-capacity, rechargeable energy storage cell 2000 similar to cell 900 of FIG. 9, with like-identified elements can be the same or similar. A metal anode 2005 (a first electrode) is matched with a sulfur-based cathode 2010 (a second electrode). The electrodes are separated by an electrolyte 2015 with a 2017 of, e.g., a porous polymer. Anode 2005 includes a current collector 2020 of, e.g., copper physically and electrically connected to an anode layer 2025 of porous carbon saturated with an organic liquid electrolyte 2015. In one embodiment, anode layer 2025 comprises a carbon-nanotube (CNT) carpet. Suitable methods of forming a cathode layer of CNTs are detailed above. Cathode 2010 includes a current collector 2030 of, e.g., aluminum physically and electrically connected to a porous cathode layer 2035 that can be saturated with electrolyte 2015. An alkali-metal layer 2037 (e.g. of lithium) in electrolyte 2015 and between electrodes 2005 and 2010, on either or both sides of the separator 2017, is in contact with the external surface of at least one of porous layers 2025 and 2035 but is initially separated from the internal surfaces (in the pores or interstices) of both porous layers. The lithium metal of layer 2037 is ionized and moved between anode 2005 and cathode 2010 when cell 2000 is charged and discharged.

Cathode layer 2035 is a nanoporous carbon-sulfur composite, a mixture of porous carbon and sulfur. The porous carbon collectively forms a matrix that improves thermal and electrical conductivity, traps harmful polysulfides that would otherwise migrate away from the cathode 2010 and accommodates expansion and contraction that accompanies the addition and depletion of lithium. Detailed treatments of cathode materials suitable for cathode layer 2035 are detailed above.

The structure of the carbon or graphene scaffolding facilitates lithium-ion transport while trapping polysulfides. This structure is fashioned without admixed lithium metal that might otherwise interfere with the formation of that structure. The absence of lithium at the cathode is compatible with lithium-metal anodes. The absence of lithium is not compatible with anode 2005, however, a carpet of carbon nanotubes that is initially formed devoid of lithium.

Lithium layer 2037 can be a continuous or perforated lithium foil, the metal of which becomes the active material in cell 2000. The mass of layer 2037 is selected such that both cathode layer 2035 and anode layer 2025 have the capacity to store the entire amount, between twenty and forty microns thick in one non-porous embodiment. Because essentially all the lithium is employed, cell 2000 exhibits improved specific capacity and energy density relative to conventional lithium-ion anodes in which the amount of lithium is generally lower than the amount of carbon that stores the lithium ions.

Figure 21:
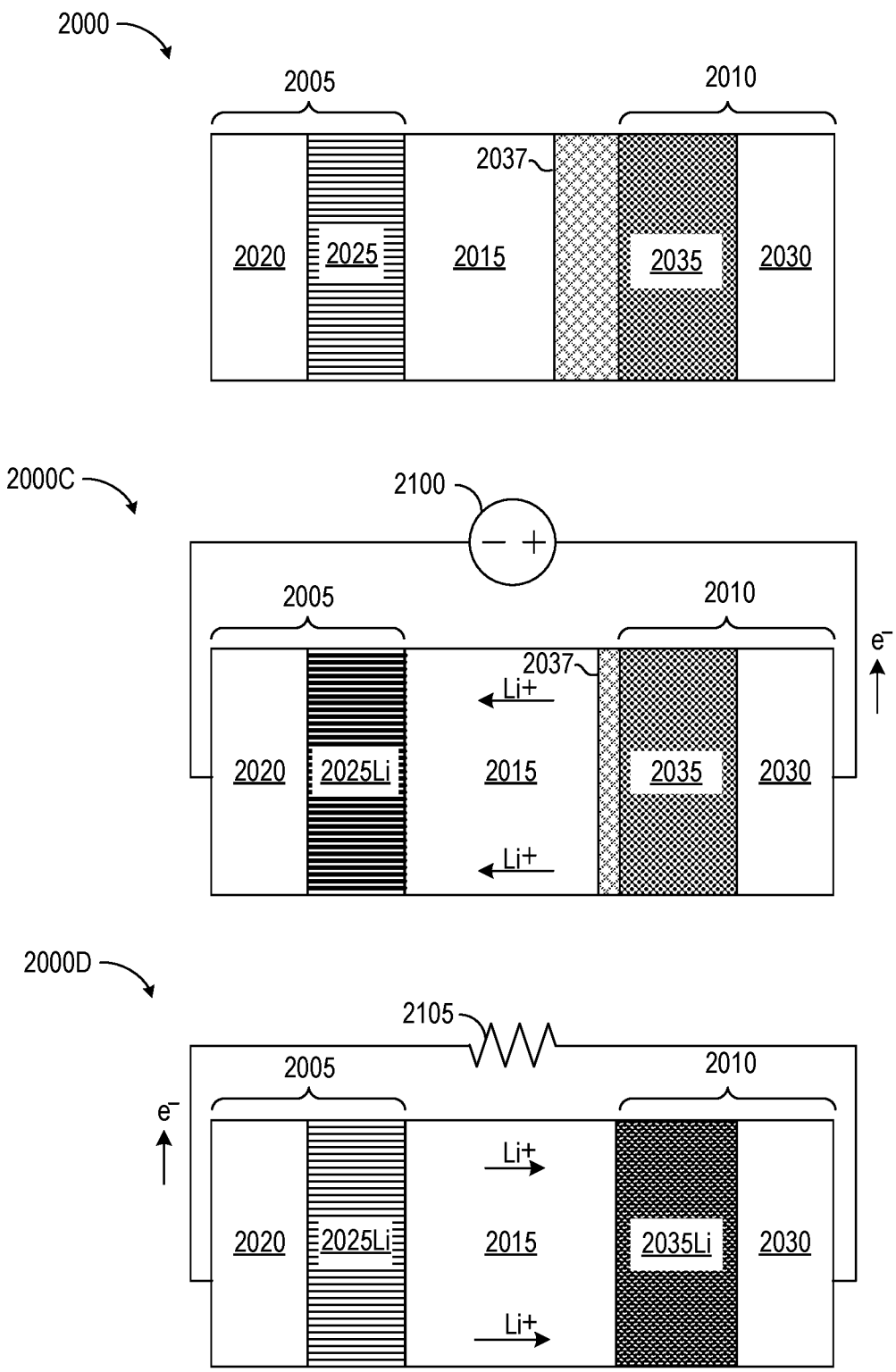
FIG. 21 shows three cross sections of cell 2000 of FIG. 20 in various states of charge and discharge.

FIG. 21 shows three cross sections of cell 2000 of FIG. 20 in various states of charge and discharge. Beginning with the uppermost example, labeled 2000, the active material within cells 2000 exists primarily in lithium layer 2037, with some lithium ions dissolved in the electrolyte (the separator is not shown). While within a discrete layer for ease of illustration, electrolyte 2015 can occupy the empty spaces within porous anode and cathode layers 2025 and 2035. Both sides of lithium layer 2037 may thus be in contact with electrolyte 2015. The cathode side of lithium layer 2037 is in physical and electrical contact with cathode layer 2035 and is physically and electrically separated from layer 2025. In other examples, lithium layer 2037 may be in contact with either anode layer 2025 or cathode layer 2035 with only one lithium surface exposed to the electrolyte. During electrolyte injection, some electrolyte may find its way into whichever porous layer is in contact with lithium layer 2037. Embodiments in which layer 2037 is e.g. granular or otherwise porous facilitate wetting of the underlying layer.

The middle example of cell 2000 is labeled 2000C, the "C" for charging. A power supply 2100 draws electrons from cathode 2010 and consequent lithium ions from anode layer 2037 as the lithium metal is oxidized. In a process called "electrostripping," layer 2037 is depleted as the material migrates as lithium ion through the separator and electrolyte 2015 to coat the interior surfaces of anode layer 2025, which is labeled 2025Li to note this modification. Though not shown, lithium layer 2037 essentially disappears when the constituent metal is depleted. Though not shown, a passivating SEI forms on CNT surfaces of layer 2025L from decomposition products of the electrolyte. The SEI passes lithium ions, blocks electrons, and prevents further electrolyte decomposition. In the depicted embodiment, anode layer 2025Li supports essentially all the lithium from layer 2037 as a coating of metallic lithium within and between carbon nanotubes. Cell 2000C is thus fully charged. Experiment has shown that pre-wetting the porous layer adjacent lithium layer 2037 is not necessary, as the electrolyte is drawn into porous surfaces either during electrolyte injection or lithium-layer depletion.

The lowermost example of cell 2000 is labeled 2000D, the "D" for discharging. A load 2105, represented as a resistor, allows electrons from anode 2005 to migrate toward cathode 2010 as lithium ions from anode layer 2025Li concomitantly migrate toward cathode 2010 to take up residence within the porous cathode layer to form lithium sulfides. The lithiated cathode layer is labeled 2035Li to note this modification. The ratio of lithium in anode layer 2025Li to the total lithium in anode and cathode layers 2025 and 2035 essentially determines the state of charge, the higher the ratio the higher the state of charge. Layer 2037 does not reform during subsequent charge and discharge cycles. A coating of lithium metal reversibly forms within the porous anode layer 2025 (e.g., between CNTs).

In one embodiment, anodes and cathodes are separately fabricated into electrode sheets. These sheets are then cut into desired shapes to form anodes 2005 and cathodes 2010. A sheet of separator material and lithium foil are likewise cut to desired shapes to form a separator and lithium layer 2037. Cell 2000 is assembled from these materials and filled with electrolyte. Lithiation then proceeds by electrostripping/electrodeposition to charge cells 2000 as illustrated by cell 2000C. In another embodiment, lithium layer 2037 is initially deposited, on either the anode or the cathode, by e.g. physical vapor deposition. Thermal evaporation of lithium, for example, can be used to produce a lithium layer with good adhesion to the target surface.

Figure 22:
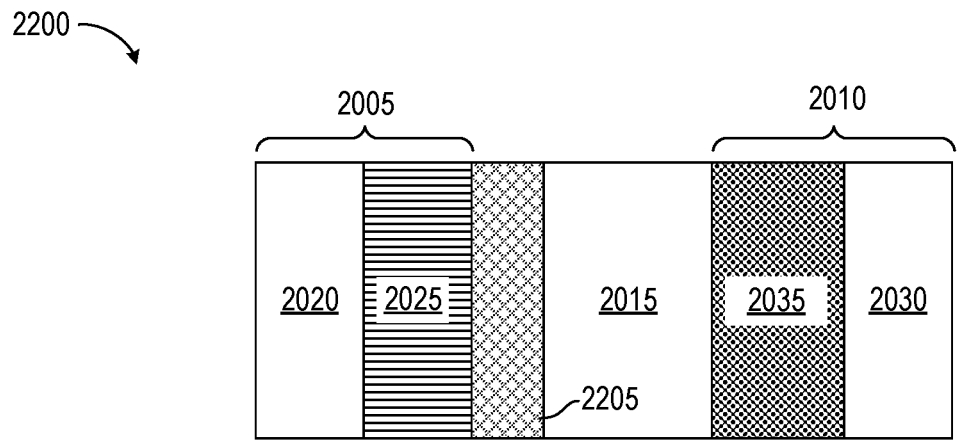
Figure 22:
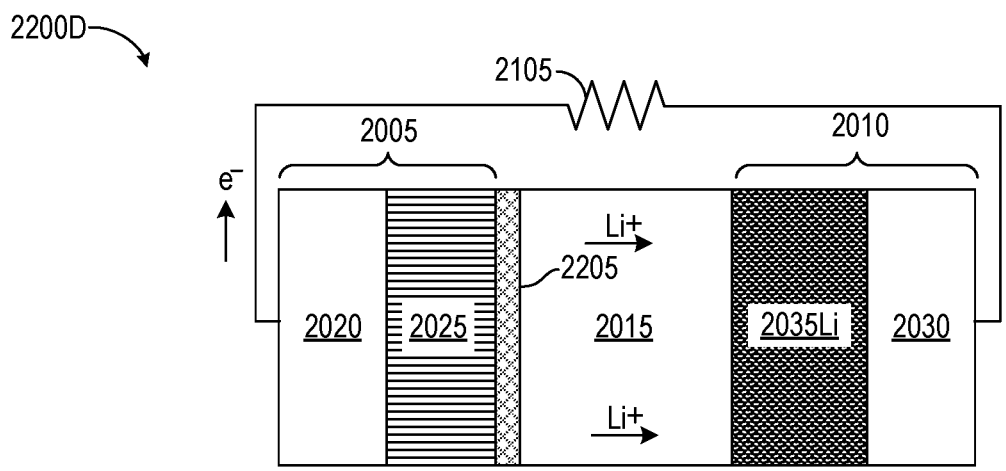
Figure 22:
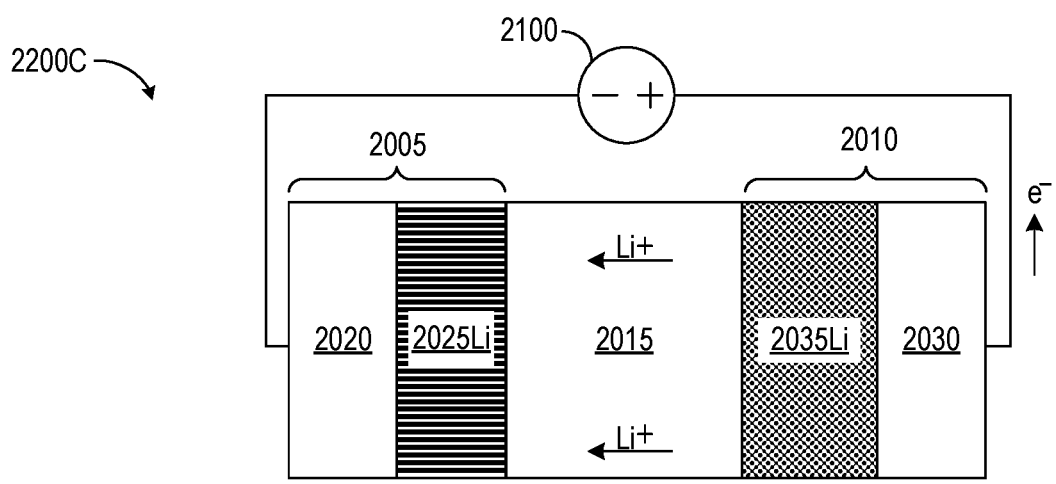

FIG. 22 shows three cross sections of a cell 2200 like cell 2000 of FIG. 20 with like-identified elements being the same or similar. The main difference is that cell 2200 includes a lithium layer 2205 (e.g. lithium foil) on the anode side of electrolyte 2015. As in the example of FIG. 21, cell 2200 is shown in various states of charge and discharge. Beginning with the uppermost example, labeled 2200, the active material within cell 2200 exists primarily in lithium layer 2205, with some lithium ions dissolved in the electrolyte on either side of layer 2205. The anode side of lithium layer 2205 is in physical and electrical contact with anode layer 2025 and is physically and electrically separated from cathode layer 2035. In some embodiments the lithium of layer 2205 can be divided in two, e.g. one layer on either side of the separator. For example, electrolyte injected into a cell can carry lithium particles that form layers of the metal on both sides of the separator.

The middle example shows cell 2200D discharging though a load 2105. Electrons and lithium ions migrate from anode layer 2025 to populate the interstices of porous cathode layer 2035Li. The lowermost example shows cells 2200C charging responsive to a power supply 2100 that draws electrons from cathode 2010 and consequent lithium ions from cathode layer 2035Li. Cathode layer 2035Li is depleted as the material migrates to the interior surfaces of anode layer 2025Li, thus forming a coating of metallic lithium within and between carbon nanotubes. Cell 2000C is thus fully charged. Layer 2205 does not reform during subsequent discharge cycles. Cell 2200 can be assembled in the manner detailed above in connection with FIG. 21, the difference being placement of lithium foil 2205 and starting with a discharge (cell 2200D) rather than a charge.

Figure 23:
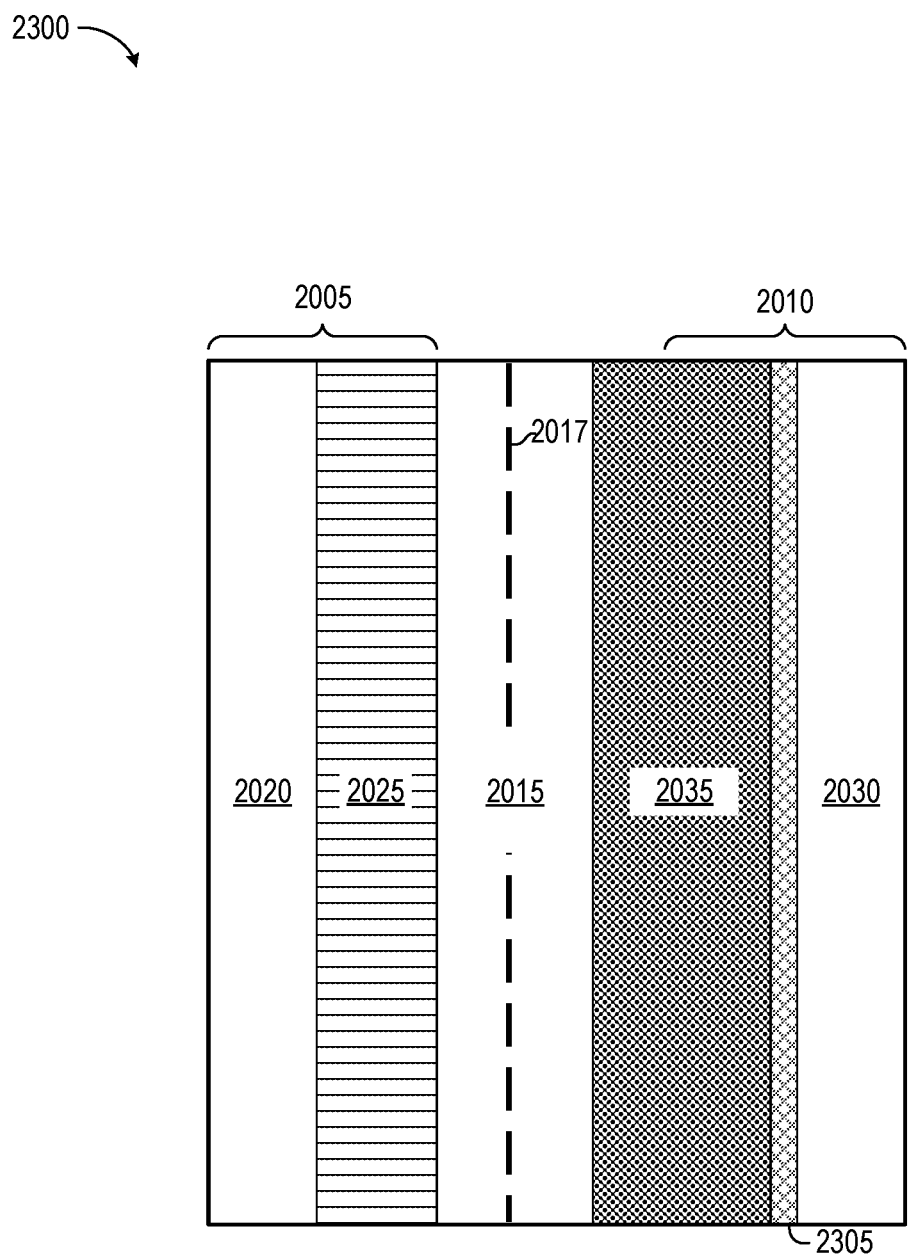

FIG. 23 depicts a rechargeable energy storage cell 2300 that is similar to storage cell 2000 of FIG. 20 with like-identified elements being the same or similar. This embodiment is lithiated with a layer 2305 sandwiched between cathode active layer 2035 and cathode current collector 2030. When cell 2300 is thus assembled, porous cathode layer 2035 allows electrolyte 2015 to create an ion path from lithium layer 2305 to CNT layer 2025. When cell 2300 is first charged, the lithium metal of layer 2305 is ionized and moved to CNT layer 2025. Cathode layer 2035 absorbs the lithium metal during subsequent discharges to that lithium layer is or is largely absent in normal use.

Lithium layer 2305 is shown on only one side of cathode current collector 2030 but can be on both sides and can be applied to either or both sides as a discrete film or films. In a continuous process, for example, a perforated 20 um lithium foil is applied to both sides of the aluminum current collector by roller and pressure. In other embodiments, the lithium layer or layers can be formed on the current collector. In one embodiment, for example, lithium layer 2305 is electrodeposited to a thickness of 20 μm in an electrolyte comprising a lithium salt dissolved in an organic solvent, e.g. 4 M lithium bis(fluorosulfonyl)imide. In one embodiment, the deposition is carried out at a current density of about 0.4 mA cm$^{-2}$ for about 10 hours, producing deposited lithium passivated by solid electrolyte interphase comprising decomposition products of the electrolyte.

The metallization steps and cells provide for energy-storage devices and methods according to any of the following numbered clauses:

1. An energy-storage device comprising:
   an anode having an anode current collector and a porous anode layer having an anode external surface and anode internal surfaces;
   a cathode having a cathode current collector and a porous cathode layer having a cathode external surface and cathode internal surfaces;
   electrolyte between the anode and the cathode; and
   an alkali-metal layer in contact with the electrolyte and between the anode and the cathode.
2. The device of clause 1, the electrolyte extending through at least one of the porous anode layer and the porous cathode layer.
3. The device of clause 1, wherein the alkali-metal layer is disposed in the cathode between the porous cathode layer and the cathode current collector.
4. The device of clause 1, wherein the alkali-metal layer consists essentially of lithium.
5. The device of clause 1, further comprising a separator in the electrolyte and between anode and the cathode.
6. The device of clause 5, wherein the alkali-metal layer is disposed between the separator and one of the porous anode layer and the porous cathode layer.
7. The device of clause 6, wherein the alkali-metal layer is separated from the cathode external surface and the anode external surface.
8. The device of clause 7, further comprising a bonding layer between the alkali-metal layer and one of the cathode external surface and the anode external surface.
9. The device of clause 5, wherein the separator is disposed between the alkali-metal layer and one of the porous anode layer and the porous cathode layer.
10. The device of clause 9, further comprising a second alkali-metal layer, wherein the separator is disposed between the second alkali-metal layer and the other one of the porous anode layer and the porous cathode layer.
11. The device of clause 1, wherein the alkali-metal layer comprises at least one of metallic particles, wires, and rods.
12. The device of clause 1, wherein the porous anode layer comprises carbon.
13. The device of clause 12, wherein the porous anode layer comprises carbon nanomaterials.

The foregoing discussion focuses on electrochemical cells that employ lithium ions as charge carriers. Other alkali metals (e.g. sodium and potassium) can also be used. Moreover, while the lithium layers are continuous films in the foregoing examples, metal layers can be introduced as e.g. perforated sheets, screens, or loose or agglomerated particles, wires, or rods that assemble into a layer during device assembly. A slurry of metal particles and electrolyte can be used in lieu of or with the electrolyte.

Variations of these embodiments will be obvious to those of ordinary skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:
1. An electrode comprising:
   a conductive framework of tangled nanofibers; and
   amorphous carbon-sulfur distributed within the tangled nanofibers, the amorphous carbon-sulfur including carbon bonded to sulfur via carbon-sulfur chemical bonds and to the nanofibers via chemical bonds;
   wherein the amorphous carbon-sulfur contains sp2 aromatic carbon clusters having an average maximum dimension of less than 20 nm dispersed within a matrix of sp3 carbon atoms.
2. The electrode of claim 1, wherein the conductive framework and the amorphous carbon-sulfur comprise less than 10 wt % oxygen.
3. The electrode of claim 1, wherein the conductive framework and the amorphous carbon-sulfur comprise more than 30 wt % sulfur.
4. The electrode of claim 1, wherein the conductive framework and the amorphous carbon-sulfur comprise about 40 wt % sulfur.
5. The electrode of claim 1 wherein the conductive framework and the amorphous carbon-sulfur comprise between 30 wt % and 80 wt % sulfur.
6. The electrode of claim 1, wherein the amorphous carbon-sulfur includes sp2 carbon atoms and sp3 carbon atoms, and wherein the ratio of sp2 carbon atoms to sp3 carbon atoms is 50-90 at. % to 50-10 at. %.
7. The electrode of claim 6, wherein the amorphous carbon-sulfur includes hydrogen, and wherein the hydrogen is 5-20 at. %.
8. The electrode of claim 1, at least one of the conductive framework and amorphous carbon-sulfur comprising a dopant.
9. The electrode of claim 1, further comprising sulfur bonded to an atom other than carbon.
10. The electrode of claim 1, further comprising free sulfur not bonded to the carbon, the free sulfur less than 20 wt % of a total of the sulfur bonded to the carbon and the free sulfur.
11. The electrode of claim 1, the amorphous carbon-sulfur comprising aromatic rings.
12. The electrode of claim 11, wherein the aromatic rings include monocyclic rings.
13. The electrode of claim 11, wherein the aromatic rings include heterocyclic rings.
14. The electrode of claim 13, wherein the heterocyclic rings comprise at least one of oxygen, nitrogen, and sulfur.
15. The electrode of claim 1, wherein the tangled nanofibers include at least one of nanotubes, nanoribbons, graphene, and carbon fibers.
16. The electrode of claim 15, wherein the amorphous carbon-sulfur is bonded to the nanofibers predominantly via covalent bonds.
17. The electrode of claim 1, wherein the tangled nanofibers include at least one of aluminum nanofibers and nickel nanofibers.
18. A method for producing the electrode of claim 1, the method comprising:
   combining nanofibers with sulfur and a polymer to produce an agglomerated powder of the nanofibers, the sulfur, and the polymer;
   mixing the agglomerated powder to heat the agglomerated powder to a temperature of between 40° C. and 90° C. to crosslink the polymer with the nanofibers to create a conductive carbon framework in a crosslinked, hardened mixture of the nanofibers, the sulfur, and the polymer; and
   heating the hardened mixture of the nanofibers, the sulfur, and the polymer to pyrolyze the polymer and chemically bond carbon from the pyrolyzed polymer to the nanofibers and the sulfur.
19. The method of claim 18, wherein heating the hardened mixture of nanofibers, sulfur, and the polymer to pyrolyze the polymer brings the mixture above a glass-transition temperature of the hardened mixture.

20. The method of claim 18, wherein the sulfur is mixed as a vapor.

* * * * *